United States Patent
Forssell et al.

(10) Patent No.: US 12,479,334 B2
(45) Date of Patent: Nov. 25, 2025

(54) ELECTRIC VEHICLE BATTERY SYSTEM CONTROL STRATEGY INCORPORATING ACTIVE CELL TEMPERATURE BALANCING

(71) Applicant: Volvo Car Corporation, Gothenburg (SE)

(72) Inventors: Jonas Forssell, Gothenburg (SE); Markus Ekström, Gothenburg (SE); Aditya Pratap Singh, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 165 days.

(21) Appl. No.: 18/463,464

(22) Filed: Sep. 8, 2023

(65) Prior Publication Data
US 2025/0083569 A1   Mar. 13, 2025

(51) Int. Cl.
*H02J 7/00* (2006.01)
*B60L 58/27* (2019.01)
*H01M 10/42* (2006.01)
*H01M 10/44* (2006.01)

(52) U.S. Cl.
CPC ......... *B60L 58/27* (2019.02); *H01M 10/4257* (2013.01); *H01M 10/441* (2013.01); *H01M 10/443* (2013.01); *H02J 7/00711* (2020.01); *H02J 7/007194* (2020.01); *H01M 2010/4278* (2013.01)

(58) Field of Classification Search
None
See application file for complete search history.

(56) References Cited

U.S. PATENT DOCUMENTS

| | | | |
|---|---|---|---|
| 11,420,534 B1* | 8/2022 | Palombini | B64C 29/0016 |
| 2016/0294198 A1* | 10/2016 | Poulis | H01M 10/4207 |
| 2017/0062793 A1* | 3/2017 | Zakharyan | H10D 84/83 |
| 2017/0106764 A1* | 4/2017 | Beaston | B60L 58/12 |
| 2020/0259232 A1* | 8/2020 | Ge | H01M 10/637 |
| 2022/0102995 A1* | 3/2022 | Fieldbinder | H02J 7/00036 |
| 2022/0185135 A1* | 6/2022 | Langton | B60L 58/12 |

(Continued)

OTHER PUBLICATIONS

Extended European Search Report received for European Patent Application Serial No. 24199227.0 dated Feb. 11, 2025, 14 pages.

*Primary Examiner* — James M McPherson
(74) *Attorney, Agent, or Firm* — Amin, Turocy & Watson, LLP

(57) ABSTRACT

Control strategies for an electric vehicle battery system that incorporate active cell temperature balancing are described. In an example, a method comprises employing, by a system operatively coupled to at least one processor, a smartcell battery system to supply power to one or more electrical systems of a vehicle, the smart cell battery system comprising a plurality of battery cells. The method further comprises controlling, by the system, operations of the battery cells in accordance with a control protocol that results in increasing a temperature of a subset of the battery cells based on the temperature being below a threshold temperature. In an example, the control protocol can include circulating current between the subset of battery cells and/or other battery cells excluded from the subset, actively discharging the subset of battery cells and redistributing the power to other battery cells excluded from the subset, and others.

20 Claims, 11 Drawing Sheets

(56) References Cited

U.S. PATENT DOCUMENTS

| | | | |
|---|---|---|---|
| 2022/0190619 A1 | 6/2022 | Fasching et al. | |
| 2022/0266718 A1* | 8/2022 | Kadam | B60L 50/66 |
| 2023/0182662 A1* | 6/2023 | Ruppert | H02J 7/0024 |
| | | | 307/10.1 |
| 2024/0227616 A1* | 7/2024 | Bloom | B60L 55/00 |
| 2024/0250320 A1* | 7/2024 | Fu | H01M 10/443 |
| 2024/0250546 A1* | 7/2024 | Wang | B60L 58/24 |
| 2024/0317098 A1* | 9/2024 | Kikuchi | B60L 53/62 |
| 2024/0332664 A1* | 10/2024 | Cruess | H01M 10/615 |
| 2024/0339691 A1* | 10/2024 | Fernandez | H02J 7/00041 |
| 2024/0345172 A1* | 10/2024 | Crosman, III | G01R 31/392 |
| 2025/0015608 A1* | 1/2025 | Umeda | H01M 10/425 |

\* cited by examiner

ELECTRIC VEHICLE BATTERY SYSTEM CONTROL STRATEGY INCORPORATING ACTIVE CELL TEMPERATURE BALANCING

TECHNICAL FIELD

The subject disclosure relates to electric and/or hybrid electric vehicle drive technologies, and more particularly to control strategies for an electric vehicle battery system that incorporate active cell temperature balancing.

BACKGROUND

Electric vehicles (EVs) are becoming increasingly popular as a more sustainable mode of transportation. Currently, an electric driveline (e.g., an electric driveline used in an electric vehicle) is based on a battery arrangement with a direct current (DC) voltage of approximately 370 volts (V). Many systems are designed around this battery arrangement to protect and control the battery cells. Auxiliary units are used to generate alternating current (AC) voltage to run motors and charge the battery cells. Such systems are often complex and expensive and can be a source of errors.

It is known from practical experience that electric drive technology is limited, for example, by the battery arrangements available today. This concerns, for example, limitations given by the complex requirements, e.g., a large number of charging cycles, performance requirements in terms of electrical power output, available capacity, operating conditions, etc. For example, controlling a battery arrangement sets high requirements if an electric machine (e.g., an electric motor) is to be operated with it.

In addition, lithium-ion battery cells used in today's commercial electric vehicles are sensitive to temperature, which impacts performance of the battery pack including range, voltage efficiency, charge time, as well as the state of health (SOH) the battery pack. For example, cold battery pack temperatures can reduce the charge/discharge capacity and power capabilities of the battery pack, as the chemical reaction inside the battery slows down, raising the internal resistance. In extreme cold (typically below 0° C.), battery cells may even stop functioning and endure irreversible damage.

Higher battery pack temperatures can also result in performance degradation including loss of capacity (e.g., owing to loss of lithium and the reduction of active materials under high temperatures), and loss of power (e.g., owing to an increase in internal resistance). Similar to extreme cold, extreme high temperatures (typically above 60° C.) can also result in the battery pack not functioning, and in some cases, results in irreversible damage. In the worst case, a thermal runaway can even trigger self-ignition and explosion.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate control strategies for an electric vehicle battery system that incorporate active cell temperature balancing.

In an embodiment, a method can comprise employing, by a system operatively coupled to at least one processor, a smartcell battery system to supply power to one or more electrical systems of a vehicle, the smart cell battery system comprising a plurality of battery cells. The method further comprises controlling, by the system, operations of the battery cells in accordance with a control protocol that results in increasing a temperature of a subset of the battery cells based on the temperature being below a threshold temperature. In an example, the control protocol can include circulating current between the subset of battery cells and/or other battery cells excluded from the subset, actively discharging the subset of battery cells and redistributing the power to other battery cells excluded from the subset, and others.

In another embodiment, a system can comprise a smartcell battery system configured to supply power to one or more electrical systems of an electric vehicle, the smart cell battery system comprising a plurality of battery cell units respectively comprising local controllers that control operations of respective battery cells connected to the local controllers. The system can further comprise a memory that stores computer-executable components, and a processor that executes the computer-executable components stored in the memory. The computer-executable components can comprise a master control component that directs one or more of the local controllers to control an operation of the respective battery cells connected thereto in accordance with a control protocol that results in increasing a temperature of a subset of the battery cells based on the temperature being below a threshold temperature.

In another embodiment, a computer program product that facilitates controlling operations of battery cells of a smartcell battery system used to supply power to one or more electrical systems of an electric vehicle. The computer program product can comprise executable instructions that, when executed by a processor, facilitate performance of operations, comprising, directing one or more of the local controllers to control an operation of the respective battery cells connected thereto in accordance with a control protocol that results in increasing a temperature of a subset of the battery cells based on the temperature being below a threshold temperature.

DESCRIPTION OF THE DRAWINGS

One or more exemplary embodiments are described below in the Detailed Description section with reference to the following drawings.

DETAILED DESCRIPTION

Figure 1:
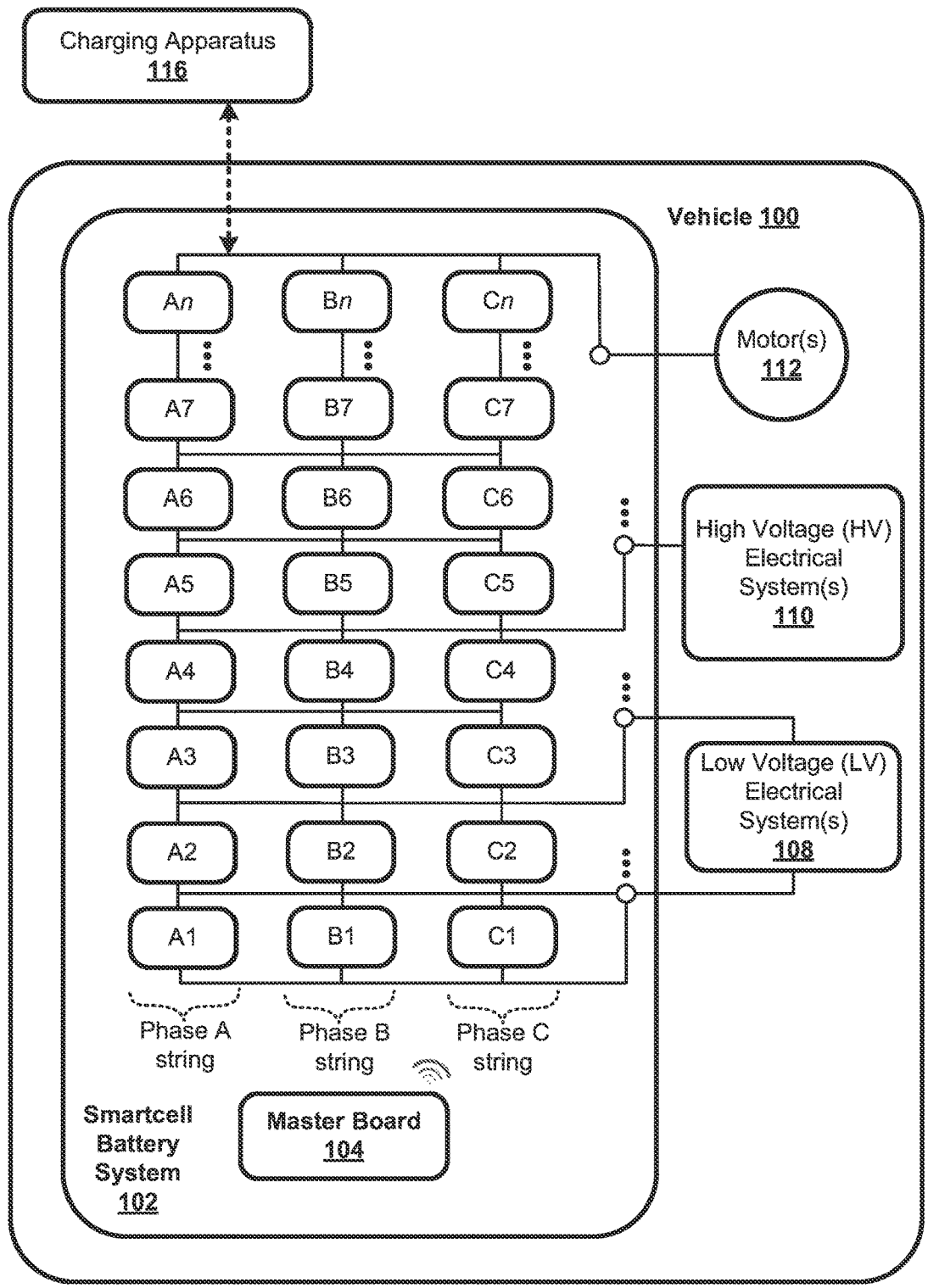
FIG. 1 illustrates an example smartcell battery system that supplies power to one or more electrical systems of an electric vehicle in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

In one or more embodiments described herein, systems, computer-implemented methods, and/or computer program products that provide one or more embodiments described herein, systems, computer-implemented methods, and/or computer program products that facilitate control strategies for an electric vehicle battery system that incorporate thermal management. The disclosed control strategies are particularly directed to techniques for controlling temperatures of battery cells of an electric vehicle in a manner that optimizes efficiency while minimizing degradation based on thermal sensitivities of the battery cells. More particularly, the disclosed techniques actively regulate temperatures of the respective battery cells using an intelligent, active cell temperature balancing protocol as opposed to using external heating and/or cooling apparatuses. To this end, the disclosed techniques are rooted in the battery system of the electrical vehicle being a smartcell battery system.

A smartcell battery system aims to remove large and costly parts from a conventional drivetrain and use the batteries more efficiently. More particularly, a smartcell battery system is a multilevel inverter concept that aims to replace driveline components such as the conventional large inverter by integrating them into printed circuit boards (PCBs) connected to clusters of battery cells. These PCBs are connected wirelessly to a central controller that handles high level control. Each of the PCBs include local wireless communication hardware, a small direct-to-direct (DCDC) converter, a plurality of power switches (e.g., high current and low voltage switches), one or more sensors, and other electronic elements hardware and software elements that enable them intelligently control and manage operations of the respective battery cells to which they are connected (e.g., rendering them "smart"). Further the PCBs enable the direct current (DC) output from a small battery cluster to be converted into an alternating current (AC) to control an electric motor through field-oriented control (FOC). The battery pack can be configured in a number of different ways depending on need for propulsion, utilization by other high and low voltage electrical systems of the vehicle and charging. Through changing the inverter switching to a smartcell battery system, the battery back can operate at double the voltage level of similar battery backs using a conventional inverter, resulting in a lower current with less losses. Further only the battery cells needed are activated instead of all batteries needing to be constantly active, thereby increasing efficiency.

In various embodiments, the disclosed active cell temperature balancing protocol is particularly directed to techniques for internally heating (e.g., without using an external heating apparatus) select battery cells of the smartcell battery system based on the temperature of the select battery cells being below a threshold temperature (e.g., less than 25° C.). In this regard, battery cells used in electric vehicles typically have a small thermal operating window in which they perform most efficiently. For example, the optimal thermal operating window is generally from about 25° C. to about 40° C. As noted in the Background Section, the battery cells can suffer from degradation when exposed to temperatures that exceed certain levels outside this thermal operating window. Generally, the internal resistance of the battery cells increases as the temperature decreases, which leads to high losses in the cells. For example, the cell internal resistance can be about five to ten times higher at lower temperatures than ambient 25° C. An increase in internal resistance can result in a high voltage drop of the cell, which can negatively affect the safety, SOC and state of health (SOH) of the cell over time.

At a high level, the disclosed active cell temperature balancing protocol aims to increase the temperature of those battery cells which are colder than other cells by taking advantage of the smartcell system's capability to selectively operate the desired cells in the battery pack. In one or more embodiments, the internal heating of the cells can be achieved by charging and/or discharging the cells through high magnitude (e.g., between about 200 Amperes (Amps) and about 400 Amps) pulse currents respectively generated over very short durations of time (e.g., about 1.0 microsecond ($\mu$s) to about 1.0 second) over a period of time (e.g., about 1.0 us to about 10.0 seconds) until the cut-off voltage of the cell is reached. By providing short bursts of high magnitude charge and/or discharge currents less than 1.0 second and more preferably on the order of microseconds, the temperature of the cells can be increased and the internal resistance of the cells can be decreased without negatively affecting the battery life of the cells.

In some implementations, the charge and discharge current can respectively be circulated between two or more low temperature battery cells to internally heat up the respective cells. The two or more battery cells can include battery cells grouped together in the same cluster of battery cells (and controlled by the same PCB) and/or battery cells associated with different clusters (and controlled by different PCBs). In other implementations, the discharge current removed from one or more low temperature battery cells can be redistributed to one or more other cells of the smartcell battery system. For example, the one or more other cells can include cells having low temperatures and/or low SOCs.

The disclosed techniques for selectively increasing the temperatures of battery cells having lower temperatures than others facilitate maintaining a uniform temperature of the cells inside the battery pack, which results in optimizing battery safety, performance, and lifespan. The internal heating of the cells can be performed during standstill of the vehicle, driving of the vehicle and during both alternating current (AC) and direct current (DC) fast charging. In some embodiments, the particular control protocol used for balancing the cell temperatures can be tailored based on the operating context of the vehicle (e.g., standstill, city-driving, high-speed driving, AC fast charging, DC fast charging, et.). For example, in some embodiments, during city driving where the full voltage of the battery pack is often not required, the control protocol can selectively ignore using power from those cells having lower temperatures than other cells, leading to better driving efficiency.

In addition, in some embodiments, the control protocol can control charging of battery cells based on temperature. In this regard, the process of performing fast charging on battery cells having low temperatures can result in degradation of lithium plating and thus negatively affecting battery performance and lifespan over time. One strategy that can be used to minimize such degradation when fast charging is performed under low external climate temperatures (e.g., less than 25° C.) involves lowering the overall magnitude of the fast-charging current supplied to the entire battery back. In other words, the charging capacity of the fast-charging equipment is reduced as magnitude of the charging current is lowered to avoid de-lithiation at low temperatures. For example, the efficiency of the fast-charging equipment may be reduced to 50% or less at temperatures between 25° C. to −25° C.

In some implementations of these embodiments, the control protocol can limit the charging rate of the fast-charging equipment as applied to charge the entire battery pack as a function of the temperatures of the respective battery cells. In this regard, reducing the charging rate corresponds to charging the battery cells at a lower current amplitude (e.g., instead of charging at 300 A, the charging rate can be lowered to 100 A). For example, the control protocol can reduce the charging rate of the battery cells in proportion to the lowest temperature battery cell such that as the lower the temperature, the lower the charging rate. In some implementations of these embodiments, as the temperature of the battery cells increases over the duration of changing, the control protocol can dynamically increase the charging rate. In other implementations of these embodiments, the control protocol can involve informing an operator of the vehicle regarding when to charge and not charge the battery pack and/or what charging rate to apply when using an external charging apparatus based on temperature, SOC of the respective battery cells the vehicle. For example, a master controller of the smartcell battery system can generate and provide the vehicle operator (e.g., via any suitable output device communicatively coupled to the master controller) with a notification message or the like informing the operator when to avoid charging the battery pack based on the temperature of one or more of the battery cells being below a threshold and/or the SOC of the battery pack being above an acceptable threshold for usage of the vehicle under a current operating context (e.g., based on route, speed and associated power demands). Still in other embodiments, the fast-charging equipment can be operated at its highest efficiency (e.g., at its highest current magnitude) even at low temperatures owing to the ability to internally increase the temperatures of the battery cells prior to performing fast-charging and the ability to selectively avoid or bypass fast-charging any battery cells having temperatures below a minimum threshold (e.g., 25° C.).

While one or more devices and/or systems are described below with reference to a wheeled vehicle, such as an automobile, the one or more embodiments described herein are not limited to this use. A battery device and/or battery system described herein can be implemented in any suitable electronic system such as, for instance, an electric driveline of an electric vehicle (EV). Indeed, the one or more devices and/or systems described herein can be utilized with any of a military vehicle, marine vehicle such as a boat or marine drone, winged vehicle such as a plane, and/or rotor-ed vehicle such as a helicopter or drone. Likewise, usage can extend to a robot and/or any suitable mobile and/or stationary device having use of a battery device or battery system.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

FIG. 1 illustrates an example smartcell battery system 102 that supplies power to one or more electrical systems of a vehicle 100 in accordance with one or more embodiments described herein. The vehicle 100 can include or correspond to an electric vehicle (EV), a battery electric vehicle (BEV), or a hybrid electric vehicle (HEV). The one or more electrical systems can include one or more motors 112, one or more high voltage (HV) electrical systems 110 and/or one or more low voltage (LV) electrical systems 108. The one or more LV electrical systems 108 can include any type of electrical system associated with the electric vehicle 100 that typically consumes a DC input voltage less than about 50 volts (V) (e.g., 12V, 14V, 15V, 40V, 48V, etc.). Some examples of the LV electrical systems can include, but are not limited to, a power steering system, an autonomous driving system, an infotainment system, a navigation system, a backup camera system, and the like. The one or more HV electrical systems 110 can include any type of electrical system associated with the electric vehicle 100 that typically consumes a DC input voltage greater than about 50 V (e.g., 48V, 72V, 100 V, 400V, etc.), such as the heating, ventilation and air conditioning (HVAC) system, and others.

The one or more motors 112 (e.g., typically a single motor for a 2-wheel drive vehicle and two motors for a 4-wheel drive vehicle) can include any type of electric vehicle motor that is part the vehicle's powertrain or drive, including one or more DC motors and/or one or more AS motors. In various embodiments, the one or more motors 112 can include or correspond to a three-phase electric motor such as a permanent magnetic synchronous motor (PMSM). A PMSM is a synchronous machine that uses permanent magnets (PM) to generate a magnetic field instead of electromagnetic windings. The three-phase machine operates using a three-phase current system. The fundamental frequency of the supplying three-phase system also decides the rotor speed by controlling the rotating magneto-motive force (MMF). Together with the field of the PM rotor, the MMF generates the torque.

The rotor consists of the PM and three static coils are the stator windings. The stator windings are distributed 120° apart from the PM in the center. The stator windings can be represented as an inductance in series with a resistance. The three windings are described as phase A, phase B, and phase C with the phase currents ia, ib and ic. When the current runs through the static coils a magnetic field is generated according to Faraday's law, and a magnetic field is generated by the PM. When the electrical angle between the MMF of the stator and the rotor field is 90°, the maximum torque is generated.

In conventional BEV systems, the three-phase current used for an AC motor such as PMSM is generated from a DC power supply by an inverter. In accordance with one or more embodiments of the disclosed techniques, the three-phase current is generated from the smartcell battery system 102 without the use of an inverter. To facilitate this end, the smartcell battery system 102 comprises a plurality of battery cells (not shown) arranged in three separate strings respectively corresponding to three different phases (e.g., Phase A string, Phase B string and Phase C string) that can provide the respective three phase currents of a three-phrase current used to drive the one or more motors 112.

In this regard, the smartcell battery system 102 includes a plurality of battery cell units 106 arranged in three separate strings respectively indicated as Phase A string, Phase B string and Phase C string. The battery cell units 106 associated with the Phase A string include units A1-An, the battery cell units associated with the Phase B string include units B1-Bn, and the battery cell units associated with the Phase C string include units C1-Cn. The number of battery cell units "n" associated with each string can vary. For example, in some implementations, the number of battery cell units n included in each string is 96, making a total of 288 battery cell units 106 in the smartcell battery system 102. However, the number of battery cell units 106 included in the smartcell battery system 102 are not limited to this configuration and can be tailored to suit various usage scenarios.

Each battery cell unit 106 A1-An, B1-Bn, and C1-Cn, can include one or more battery cells and a PCB device (referred to herein as a "cluster board") that includes several power electronic elements that enable them to intelligently control and manage operations of the respective battery cells to which they are connected. Further the cluster boards enable the DC output from a from respective battery cells to which they are connected to be converted into an AC to control one or more electric motors 112 through field-oriented control FOC. These cluster boards are connected wirelessly to a master board 104 that handles high level control.

Figure 2A:
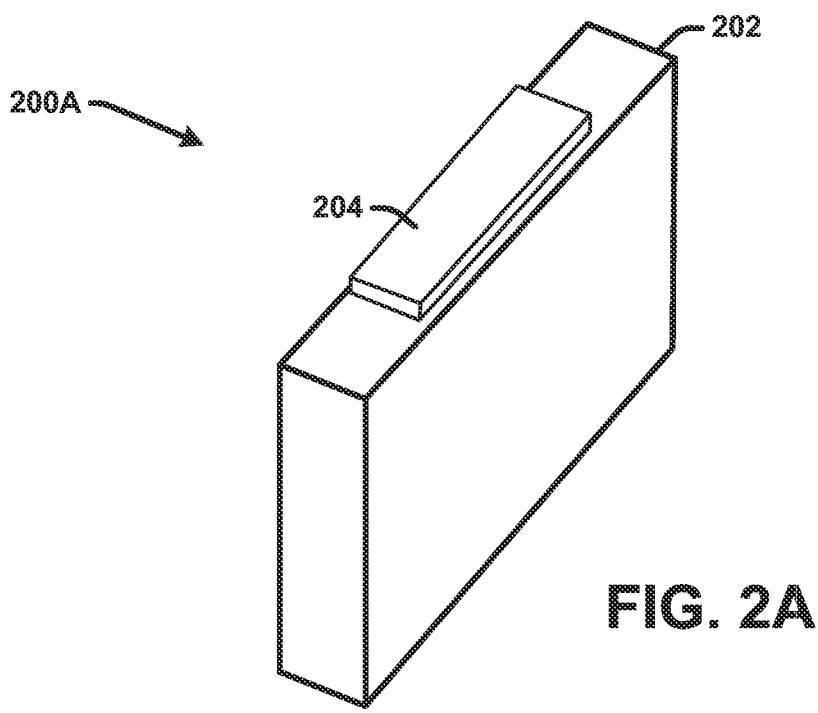
FIG. 2A illustrates an example battery cell unit of a smartcell battery system in accordance with one or more embodiments described herein.
Figure 2B:
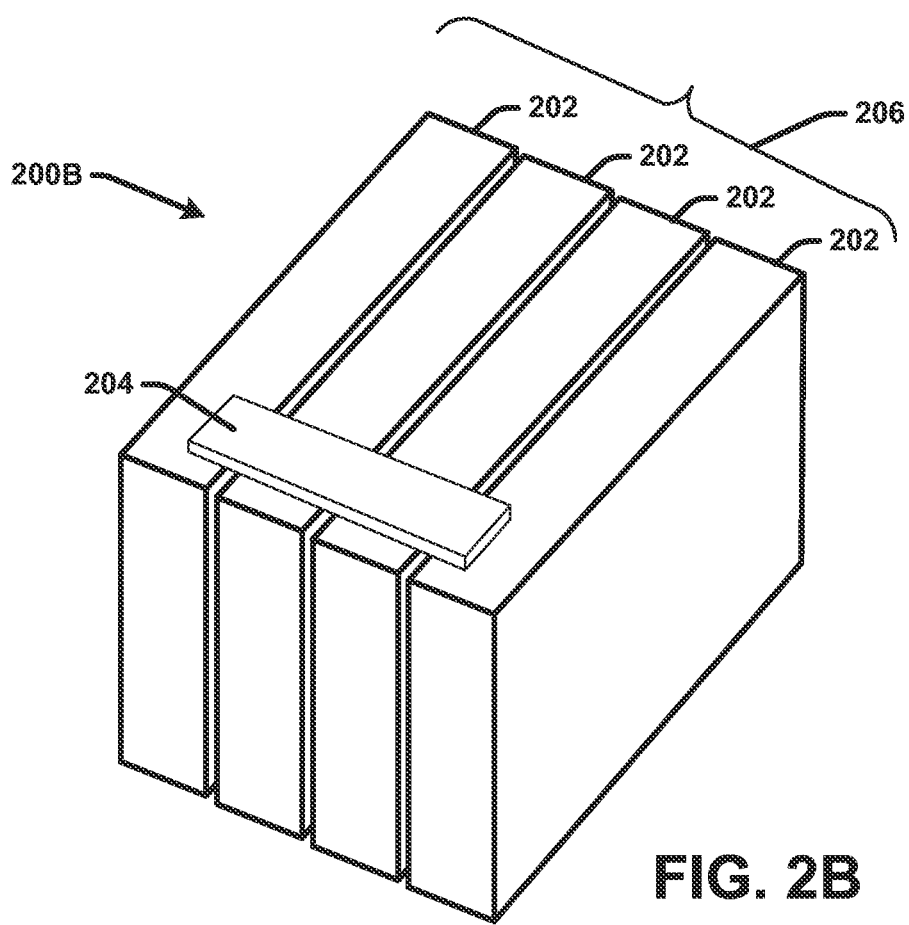
FIG. 2B illustrates another example battery cell unit of a smartcell battery system, unit in accordance with one or more embodiments described herein.

FIGS. 2A and 2B illustrate example battery cell units of the smartcell battery system 102 in accordance with one or more embodiments described herein. FIG. 2A illustrates an example battery cell unit 200A comprising a single battery cell 202. FIG. 2B illustrates another example battery cell unit 200B comprising a plurality of battery cells 202. With reference to FIGS. 1, 2A and 2B, in various embodiments, all or some of the battery cell units 106 A1-An, B1-Bn, and C1-Cn shown in FIG. 1 can correspond to battery cell unit 200A and/or battery cell unit 200B.

As shown in FIG. 2A in some embodiments, one or more of the battery cell units 106 A1-An, B1-Bn, and C1-Cn can comprise a single battery cell 202. In other embodiments, one or more of the battery cell units 106 A1-An, B1-Bn, and C1-Cn can comprise a cluster 206 of battery cells 202, wherein the cluster 206 can comprise two or more battery cells 202. The number of battery cells 202 included in a cluster 206 can vary. For example, although battery cell unit 200B is illustrated with four battery cells 202, it should be appreciated that the number of battery cells 202 can be tailored for different usage scenarios and power demands. The battery cells 202 can respectively comprise any type of rechargeable electric vehicle batteries. For example, the battery cells 202 can comprise any type of active cell material, such as for instance, a lithium battery cell material, a lithium ion (Li-Ion) battery cell material, a lithium metal battery cell material, a lithium sulphur (Li—S) battery cell material, a molten salt (Na—NiCl2) battery cell material, a nickel metal hydride (Ni-MH) battery cell material, a lead acid battery cell.

All or some of the battery cell units 106 A1-An, B1-Bn, and C1-Cn can include a cluster board 204 formed thereon and electrically connected to one or more the battery cells 202 respectively associated with the battery cell units 106. For example, the cluster board 204 can be physically attached to a single battery cell 202 or one or more of the respective battery cells 202 included a cluster 206. The manner in which the cluster board is physically attached to a single battery cell 202 (e.g., as exemplified with respect to battery cell unit 200A) and/or a cluster 206 of battery cells (e.g., as exemplified with respect to battery cell unit 200B) can vary. For example, the cluster board 204 may be materially bonded to one or more battery cells 202, such as via one or more welded bonds (e.g., solder material welded bonds, laser material welded bonds, etc.) and/or via one or more adhesive material bonds). Alternatively, the cluster board device 204 may be attached to one or more battery cells 202 via one or more screw connections.

The manner in which the cluster board 204 (or components thereof) is electrically connected to a single battery cell 202 and/or cluster 206 of battery cells 202 can also vary. For example, each of the battery cells 202 can comprise one or more terminals or power points (not shown) and the cluster board 204 (or components thereof) can be electrically connected to at least one terminal of the battery cells 202 via any suitable thermal connections (e.g., busbars, direct metal-to-metal component connections, wired connections, etc.). In some embodiments, each of the battery cells 202 can comprise four terminals or output points, wherein two of these may be AC terminals or power points and two may be isolated DC terminals or power points. In some embodiments as applied to a cluster 206 of battery cells 202, the cluster board 204 (or components thereof) may be electrically connected to at least one terminal of each battery cell of the cluster 206. In other embodiments as applied to a cluster 206 of battery cells 202, the PCB device 204 (or components thereof) may be electrically connected to at least one terminal of at least one battery cell 202 of the cluster 206.

The battery cell units 106 A1-An, B1-Bn, and C1-Cn (and/or components thereof) can be electrically connected to one another (e.g., via hardwire connections) in series and/or in parallel in a suitable number to reach a desired voltage and/or to form independent subgroups of the battery cell units 106 connected to different electrical systems (e.g., one or more of the LV electrical systems 108 and/or the HV electrical systems 110) of the electric vehicle 100. The battery cell units 106 (and/or components thereof), and or subgroups of the battery cell units 106, can further be connected electrically (e.g., via hardwire connections) to one or more motors 112, one or more of the LV electrical systems 108 and/or the HV electrical systems 110.

For example, in various embodiments, some or all of the battery cell units 106, A1-n. B1-n, and C1-n (or portions thereof as applied two electric motors in a 4-wheel drive machine) can be used to feed a DC electrical current to one or more LV electrical systems 108 and/or one or more HV electrical systems 110 as well as to feed AC electrical current to the one or more motors 112. To facilitate this end, the respective cluster boards 204 of the battery cell units 106 can include a DCDC converter that can be used to generate a desired DC output voltage for feeding the LV and/or HV electrical systems. The DCDC converters of the respective battery cell units 106 can be connected in series and/or in parallel (e.g., via wired connections). The respective cluster boards 204 can also include an H-bridge and each of the H-bridges can be connected in series (via wired connections). The battery cell units 106 can feed the respective AC phase currents from (each of the three phase strings A, B and C) to the one or more motors 112 via their respective battery cell clusters and H-bridge connections independent from their respective DCDC converters which feed the DC current to the corresponding LV electrical systems 110 or HV electrical systems 112 to which they are connected. Various configurations are envisioned.

In this regard, the cluster board 204 can include or correspond to a circuit board device that comprises electronic or electrical hardware (and software) components that enable the cluster board 204 to intelligently control various operations of the respective battery cells 202 connected thereto, including supplying DC output and AC output to the corresponding electrical systems of the electric vehicle 100. The electronic or electrical hardware components can include, but are not limited to: a DCDC converter, a power module comprising a number of power switches used for the DCDC converter and the H-bridge (among other functions), busbars, wires, ports, one or more sensors, one or more control units (e.g., comprising a microprocessor, a central processing unit (CPU) coupled to memory device, or the like), a wireless communication component (e.g., a radio frequency (RF) transmitter/receiver, transceiver, or the like), and various others.

In various embodiments, the battery cells 202 of the smartcell battery system 102 can be charged via an external charging apparatus 116 during inactive drive times. The type of the external charging apparatus 116 can vary. For example, the external charging apparatus 116 can include a DC charger, a DC fast charger, an AC charger, an AC fast charger, and other types of external EV chargers developed in the future. The battery cells 202 can also be charged via one or more onboard charging mechanisms during active drive times (e.g., an onboard charger, from the grid, and/or via redistributing current between the cells in accordance with the disclosed techniques). An external AC charger provides AC power to an on-board charger (not shown) of the vehicle 100, converting that AC power to DC in order to enter the battery cells. As noted above, in various embodiments, each of the cluster boards 204 of the battery cell units 106 A1-An, B1-Bn, and C1-Cn can include a small DCDC converter. In some implementations, the DCDC converter can be configured to convert AC input power received from an external AC charger into DC power in association with charging the battery cells 202. In other implementations, vehicle 100 can include a separate, dedicated on-board charger configured to convert the AC power into DC in association with charging the battery cells 202. DC Fast charging bypasses the limitations of the on-board charger and required conversion, instead providing DC power directly to the battery cells. Charging times are dependent on the battery size and the output capacity of the charging apparatus, and other factors, but many vehicles are capable of getting an 80% charge in about or under an hour using most currently available DC fast chargers.

As noted above, the cluster boards 204 of each of the battery cell units 106 A1-*n*. B1-*n*, and C1-*n* can be connected wirelessly (e.g., via any suitable wireless communication technology) to a master board 104 that handles high level control. In this regard, the master board 104 and the battery cell units 106 A1-*n*, B1-*n*, and C1-*n* can be configured to operate in accordance with a server-client architecture, wherein the master board 104 communicates (i.e., broadcasts, transmits, sends, etc.) control information to the respective battery cell units 106, and wherein the battery cell units 106 are configured to control operations of the respective battery cell units 106 in accordance with the received control information. The operations can include operations related to active usage and inactive usage of the battery cells 202 to supply power to one or more electrical systems of the vehicle 100 (e.g., one or more LV electrical systems 108, one or more HV electrical systems 110 and/or one or more motors), operations related charging the battery cells 202, operations related to monitoring parameters of the battery cells 202 and/or the cluster boards 204, communication operations, and various others.

Figure 3:
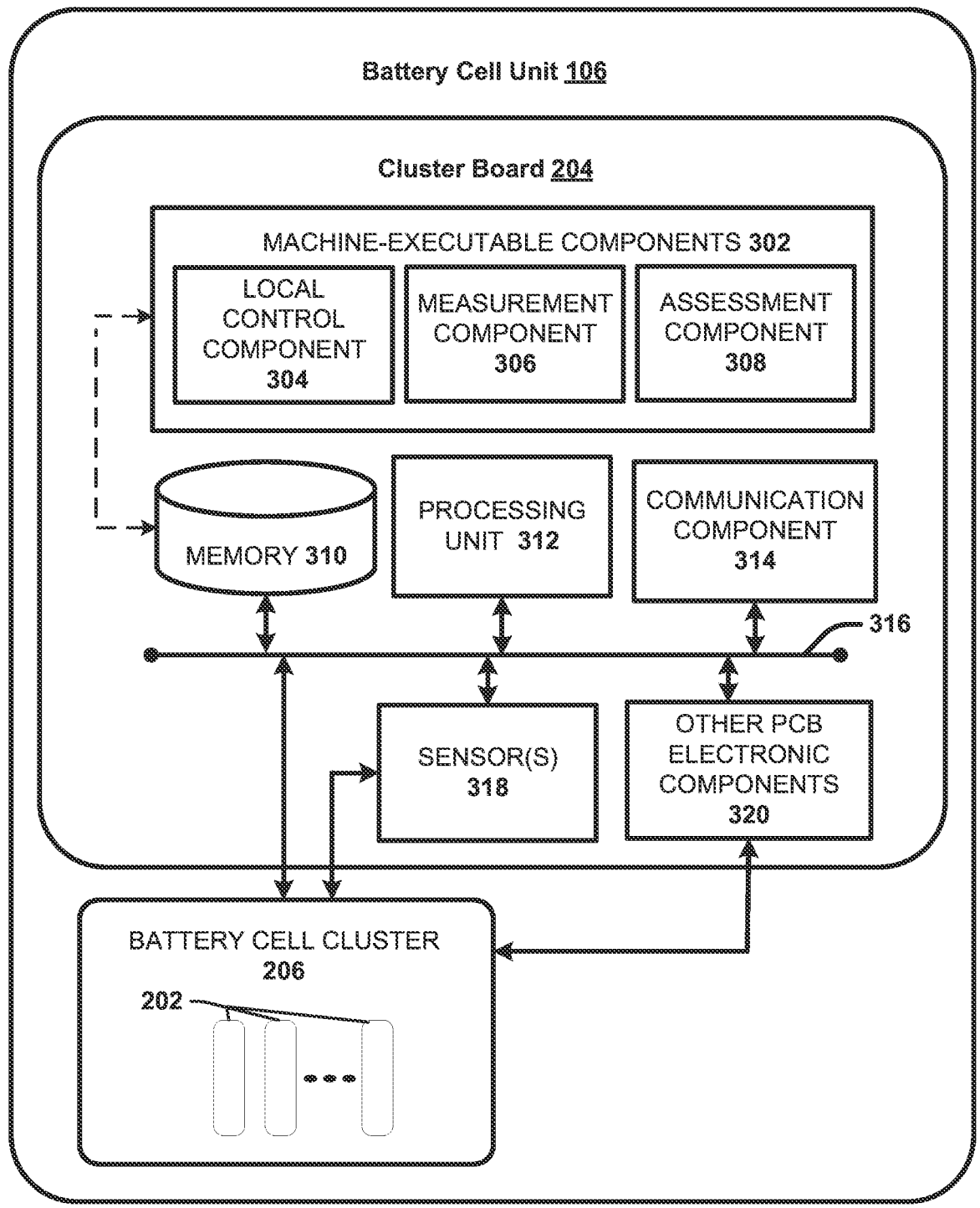
FIG. 3 illustrates a high-level block diagram of an example battery cell unit of a smartcell battery system, in accordance with one or more embodiments described herein.

FIG. 3 illustrates a high-level block diagram of an example battery cell unit 106 of the smartcell battery system 102, in accordance with one or more embodiments described herein. With reference to FIGS. 1-3, the battery cell unit 106 can include or correspond to some or all of the battery cell units 106 A1-*n*, B1-*n*, and C1-*n*. Repetitive description of like elements employed in respective embodiments is omitted for sake of brevity.

As illustrated in FIG. 3, the cluster board 204 can include a memory 310 that can store computer or machine-executable components 302, including local control component 304, measurement component 306 and assessment component 308. The cluster board 204 can further include a processing unit 312 that executes the machine-executable components 302 stored in memory 310. The cluster board 204 can further include a communication component 314 that enables wireless communication between the cluster board 204 and the master board 104. In some embodiments, the communication component 314 can also enable wireless communication between the cluster boards 204 respectively connected to each of the battery cell units 106 A1-*n*. B1-*n*, and C1-*n*. Additionally, or alternatively, the cluster boards 204 of the other battery cell units 106 A1-*n*, B1-*n*, and C1-*n* and the master board 104 may be communicatively coupled to one another via suitable wired connections. In this regard, communication component 314 can respectively include or correspond to suitable hardware and/or software that enables wireless communication between the cluster board 204 and the master board 104, and optionally other external systems and/or devices. For example, the communication component 314 can comprise a transmitter, a receiver, and/or a transceiver. The communication component 314 can employ any suitable proprietary and/or non-propriety wireless communication protocols, which can comprise virtually any desired wired or wireless technology, including but not limited to: powerline ethernet, wireless fidelity (Wi-Fi), BLU-ETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example and as described above, the communication component 314 can include hardware (e.g., a central processing unit (CPU), a transceiver, a decoder, an antenna, quantum hardware, a quantum processor, etc.), software (e.g., a set of threads, a set of processes, software in execution, quantum pulse schedule, quantum circuit, quantum gates, etc.) or a combination of hardware and software that facilitates communicating information between cluster board 204 and the master board 104.

The cluster board 204 can further include one or more sensors 318 and various other PCB electronic components. The one or more sensors 318 can sensors various types of sensors coupled to the battery cell cluster 206, individual battery cells 202 and/or the electrical hardware components of the cluster board 204 configured to measure and/or detect various conditions associated with the battery cells 202 and/or the cluster 206, and/or the battery cell unit 106. For example, the one or more sensors 318 can include, but are not limited to, temperature sensors, pressure sensors, chemical sensors, power sensors (e.g., voltage meters, current flow sensors, etc.) motion sensors, fault sensors, contact sensors, impedance sensors, and the like. In some implementations, the one or more sensors 318 can include one or more impedance sensors configured to measure impedance of the battery cells 202 via electrochemical impedance spectroscopy (EIS) measurements. With these embodiments, the master board 104 can monitor (e.g., via monitoring component 406) the impedance of the battery cells of the battery pack in association with detecting anomalies and error conditions. The other PCB electronic components 320 can include or correspond to the various electrical components of the cluster board 204 that enable the functionality of the cluster board 204 as applied to the smartcell battery system 102. For example, as noted above, the other PCB electronic components 320 can include but are not limited to, a DCDC converter, a power module comprising a number of power switches used for the DCDC converter and the H-bridge (among other functions), busbars, wires, ports, and various others. The cluster board 204 can further include a system bus 316 that communicatively and/or operatively connects the various hardware and software components of the cluster board 204 to one another and the individual battery cells 202, and/or the battery cell cluster 206.

In various embodiments, the local control component 304 can operations of the battery cells 202 and/or the cluster 206. In particular, the local controller 304 can control connection, disconnection and/or bypass of individual battery cells 202 to one another and other electrical components of the vehicle 100. To this end, the local controller 304 can control flow of electrical current into individual battery cells 202 and/or the cluster 206 in association with charging the battery cells 202 and/or the cluster 206, as well as flow of electrical current out of the battery cells 202 and/or the cluster 206 via controlling switching of respective power switches (e.g., MOSFETs, FETs, etc., included in the other PCB electronic component 320) and controlling operations of the various electrical circuit components of the cluster board 204 (e.g., the DCDC converter circuit, the H-bridge, a modulator, etc., included in the other PCB electronic component 320). For example, in some embodiments, the other PCB electronic component 320 can include an H-bridge that connects the battery cells 202 and/or the cluster 206 to one another, the one or more electrical systems of the vehicle (e.g., the one or more LV electrical systems 108, the one or more HV electrical systems 110 and/or the one or more motors 112), and/or the external charging apparatus 116. The H-bridge can include any suitable number of power switches, transistors, capacitors and/or other circuit elements. The switches and/or transistors can be operated, such as via control by the local control component 304, such to control current flow into the battery cells 202 and/or the cluster 206, to prevent current flow into the battery cells 202 and/or the cluster 206, and to control flow of current from the battery cells 202 and/or the cluster 206 one or more electrical systems of the vehicle 100 and/or other battery cells of the smartcell battery system 102 associated with other battery cell units 106 A1-$n$, B1-$n$, and C1-$n$.

For example, in various embodiments, the battery cells 202 (e.g., individually) and/or the clusters 206 of battery cells can be operated (e.g., by the local control component 304) in different operating modes, including selectively providing a positive voltage output, a negative voltage output and no voltage output (e.g., bypass) on the cell level and/or on the cluster level. The local control component 304 can also control the type of output electrical current supplied (e.g., AC or DC), the amount of electrical current supplied, and the time or duration of the electrical output current supplied. The amount of electrical current supplied can be a function of the magnitude of the electrical current, generally measured in Amperes, the flow rate or voltage level of the electrical current, and the duration of supply. In some embodiments, the local control component 304 can also control the particular electrical systems of the vehicle 100 to which output electrical current is supplied. The local control component 304 can similarly control the amount (e.g., voltage and/or amplitude) and duration of input current (e.g., charge current) received and supplied to the respective battery cells 202 and/or cluster 206 in association with charging the respective battery cells 202. In some embodiments, the local control component 304 can also control the particular circuit channels from which the input current is received. For example, the local control component can control the flow on input current (e.g., charge current) to the battery cells 202 from an external charging apparatus 116, from an on-bard charging apparatus, from the grid, and/or from other battery cells of the smartcell battery system 102 associated with other battery cell units 106 A1-$n$, B1-$n$, and C1-$n$.

The measurement component 306 can control measuring and monitoring various conditions and/or operating parameters associated with the cluster board 204 and the battery cells 202 and/or the cluster 206. These conditions and/or operating parameters are collectively referred to herein as battery cell unit parameter information. For example, the battery cell unit parameter information can include various battery cells parameters pertaining to the condition and/or status of the battery cells 202 individually and/or the cluster 206 collectively, captured via one or more sensors 318, such as but not limited to, temperature, resistance, charge level, voltage level, cell pressure level, cell material chemistry, impedance, and various others. The conditions and/or operating parameters can also include information identifying or indicating the current operating mode of the battery cells 202 and/or the cluster 206 as well as the amount (e.g., magnitude and flow rate) and timing (e.g., timing of initiation and completion) of electrical current being extracted from or supplied to the respective battery cells 202.

The battery cell unit parameter information can also include SOC and SOH of individual battery cells 202 and/or the cluster 206. The state of charge (SOC) of a battery describes the difference between a fully charged battery and the same battery in use. It is associated with the remaining quantity of electricity available in the cell. It is defined as the ratio of the remaining charge in the battery, divided by the maximum charge that can be delivered by the battery. In the domain of EVs, state of health (SOH) is a figure of merit of the condition of a battery cell 202 or group of battery cells (e.g., a cluster 206 and/or all of the battery cells 202 included in the smartcell battery system 102), compared to its ideal conditions. For example, the unit of SOH can be a represented as a percentage value (or another value), wherein a 100% SOH means that the battery's conditions match the battery's specifications. Typically, a battery's SOH will be 100% at the time of manufacture and will decrease over time and use. However, a battery's performance at the time of manufacture may not meet its specifications, in which case its initial SOH will be less than 100%. The main factors that contribute to battery degradation are driver patterns, driver aggression, climate, cabin thermal dynamics, and infrastructure, with driver patterns and climate being the most influential. As SOH does not correspond to a particular physical quality, there is no consensus in the industry on how SOH should be determined.

In various embodiments, the SOH of an individual battery cell 202 and/or a cluster 206 can be determined by the assessment component 308 (and/or the master control board 104) based on one or more of the following parameters: internal resistance, internal impedance, internal conductance, capacity, voltage, self-discharge, ability to accept charge, number of charge/discharge cycles, battery age, thermal profile of the battery, and total energy charge and discharged. To this end, in some embodiments, the measurement component 306 can measure and/or determine (e.g., using one or more sensors 318) current values for one or more of these parameters and the assessment component 308 (and/or the master board 104) can be configured to calculate a current SOH for the battery cells 202 and/or cluster 206 based on current and historical measurements (e.g., tracked parameters over time) using a previously defined algorithm or process.

In some embodiments, the cluster board 204 can be configured to regularly and/or continuously provide the master board 104 with the battery cell parameter information. For example, respective cluster boards 204 of the battery cell units 106 A1-*n*, B1-*n*, and C1-*n* can be configured to provide the battery cell unit parameter information to the master board 104 in accordance with a defined frequency (e.g., every 1.0 millisecond, every 1.0 second, every 1.0 minute, every 5.0 minutes, etc.), in response to a trigger event (e.g., charge level dropping below a threshold, a temperature dropping below a threshold, or the like), and/or in response to a request received from the master board 104. As described in greater detail below, the master board 104 can be configured to determine and control operations of the respective battery cell units 106 A1-*n*, B1-*n*, and C1-*n* on a master or global level based at least in part on the current operating parameters and/or conditions (e.g., reflected in the battery cell unit parameter information) of the respective battery cell units. In this regard, in various embodiments, the master board 104 can and the battery cell units 106 A1-*n*, B1-*n*, and C1-*n* can be configured to operate in accordance with a server-client architecture, wherein the master board 104 communicates (i.e., broadcasts, transmits, sends, etc.) control information to the respective battery cell units 106 determined based in part on their battery cell unit parameters, and wherein the battery cell units 106 are configured to control operations of the respective battery cell units 106 in accordance with the received control information.

The local control component 304 can also control wireless communication between the cluster board 204 and the master board 104 (e.g., via communication component 314) in accordance with a defined communication protocol. For example, the local control component 304 can control timing of transmission of battery cell unit parameter information to the master board 104. The measurement component 306 can control measuring and collecting any current sensor measurements from one or more sensors 318 connected to the cluster board 204. The assessment component 308 can perform intelligent processing functions for the cluster board 204. For example, in some embodiments, the assessment component 308 can perform same or similar processing functions described with respect to the master board 104, yet locally, in association with performing control functions autonomously in between reception of control information from the master board 104.

Figure 4:
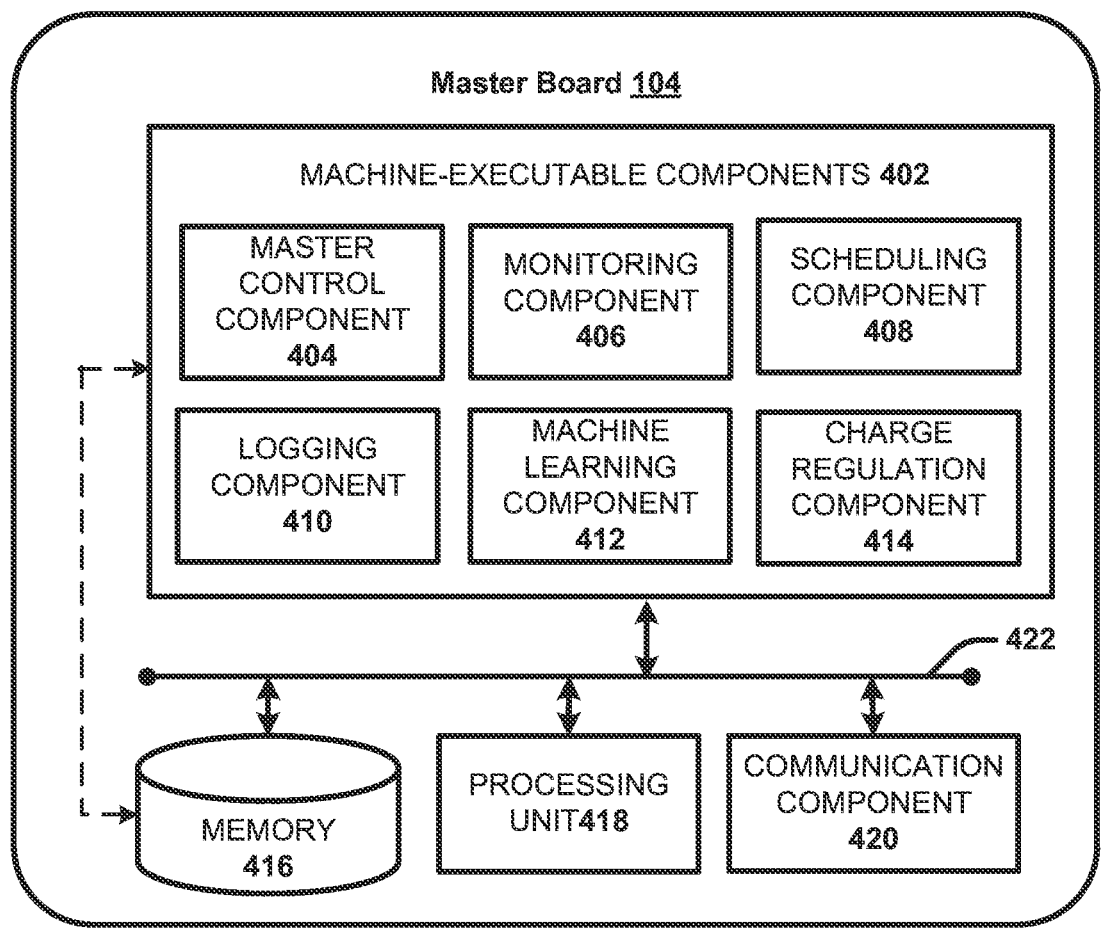
FIG. 4 illustrates a high-level block diagram of an example master board in accordance with one or more embodiments described herein.

FIG. 4 illustrates a high-level block diagram of an example master board 104 in accordance with one or more embodiments described herein. With reference to FIGS. 1-4, the master board 104 can include a memory 416 that can store computer or machine-executable components 402, including master control component 404, monitoring component 406, scheduling component 408, logging component 410, machine learning component 412 and charge regulation component 414. The master board 104 can further include a processing unit 418 that executes the machine-executable components 402 stored in memory 416. The master board 104 can further include a communication component 420 that enables wireless communication between the master board 104 and the cluster boards 204 of the respective battery cell units 106 A1-*n*, B1-*n*, and C1-*n*. For example, communication component 420 can correspond to communication component 314, and thus repetitive description is omitted for sake of brevity. The master board 104 can further include a system bus 422 that couples memory 416, processing unit 418 and communication component 420 to one another.

In various embodiments, master control component 404 can include or correspond to the main controller of the smartcell battery system 102. In this regard, the master controller can perform the high-level control functions, including directing the respective battery cell units 106 A1-*n*, B1-*n*, and C1-*n* (or more particularly the local control components 304 thereof) how to control operations of the respective battery cells 202 and/or clusters 206 connected thereto. To facilitate this end, the monitoring component 406 can regularly and/or continuously monitor the parameters of the respective battery cell units 106 A1-*n*, B1-*n*, and C1-*n* over the course of operation of the vehicle 100 (under various operating contexts) as well as the power demands of the electrical systems of the vehicle. In some embodiments, the monitoring component 406 can also monitor and/or determine the current operating context of the vehicle 100 which can vary. For example, in some implementations, the different vehicle operating contexts can include, but are not limited to standstill, city-driving, high-speed driving, AC charging, DC charging, and the like. The monitoring component 406 can also monitor driving patterns, driving speeds, external climate conditions, vehicle location, and various other conditions associated with the vehicle 100. In some embodiments, in association monitoring the battery cell unit parameter information and the power demands, the monitoring component 406 can initiate downstream processing functions based on detected changes in the information and/or parameters values in the information corresponding to a trigger condition (e.g., an increase or decrease in temperature beyond a threshold, failure to receive a particular parameter value, indicating a potential fault or error associated with a battery cell unit, etc.) for downstream processing (e.g., via the scheduling component 408, the logging component 410 and/or the machine learning component 412). In some embodiments, the logging component 410 can log (e.g., record and track in one or more log files/records or the like stored in memory 416) some or all of the battery cell unit parameter information and various other monitored conditions of the vehicle 100 over time.

The scheduling component 408 can determine control information for the respective battery cell units 106 A1-n, B1-n, and C1 that controls operations of the respective battery cell units based at least in part on the monitored parameters of the respective battery cell units 106 A1-n, B1-n, and C1. For example, the scheduling component 408 can determine control information that controls when and how the respective battery cell units 106 A1-n, B1-n, and C1 should operate their respective battery cells and/or clusters 206 to generate and supply electrical current to the one or more electrical systems of the vehicle 100 to satisfy the current power demands under a current operating context of the vehicle 100. The scheduling component 408 can also determine control information that controls when and how the respective battery cell units 106 A1-n, B1-n, and C1 should perform charging and discharging operations, and when and how they should current flow between the respective battery cells 202 and various other operations. The master control component 404 can further direct the respective battery cell units 106 A1-n, B1-n, and C1 to control operations thereof in accordance with the control information determined by the scheduling component 408. For example, the master control component 404 can communicate (e.g., transmit, broadcast, send, etc.) the control information to the respective battery cell units 106 A1-n, B1-n, and C1 determined by the scheduling component 408 and the respective battery cell units (e.g., via their local control components 304) can be configured to control the operations of their corresponding battery cells 202 and/or clusters 206 in accordance with the control information, as illustrated in FIG. 5.

Figure 5:
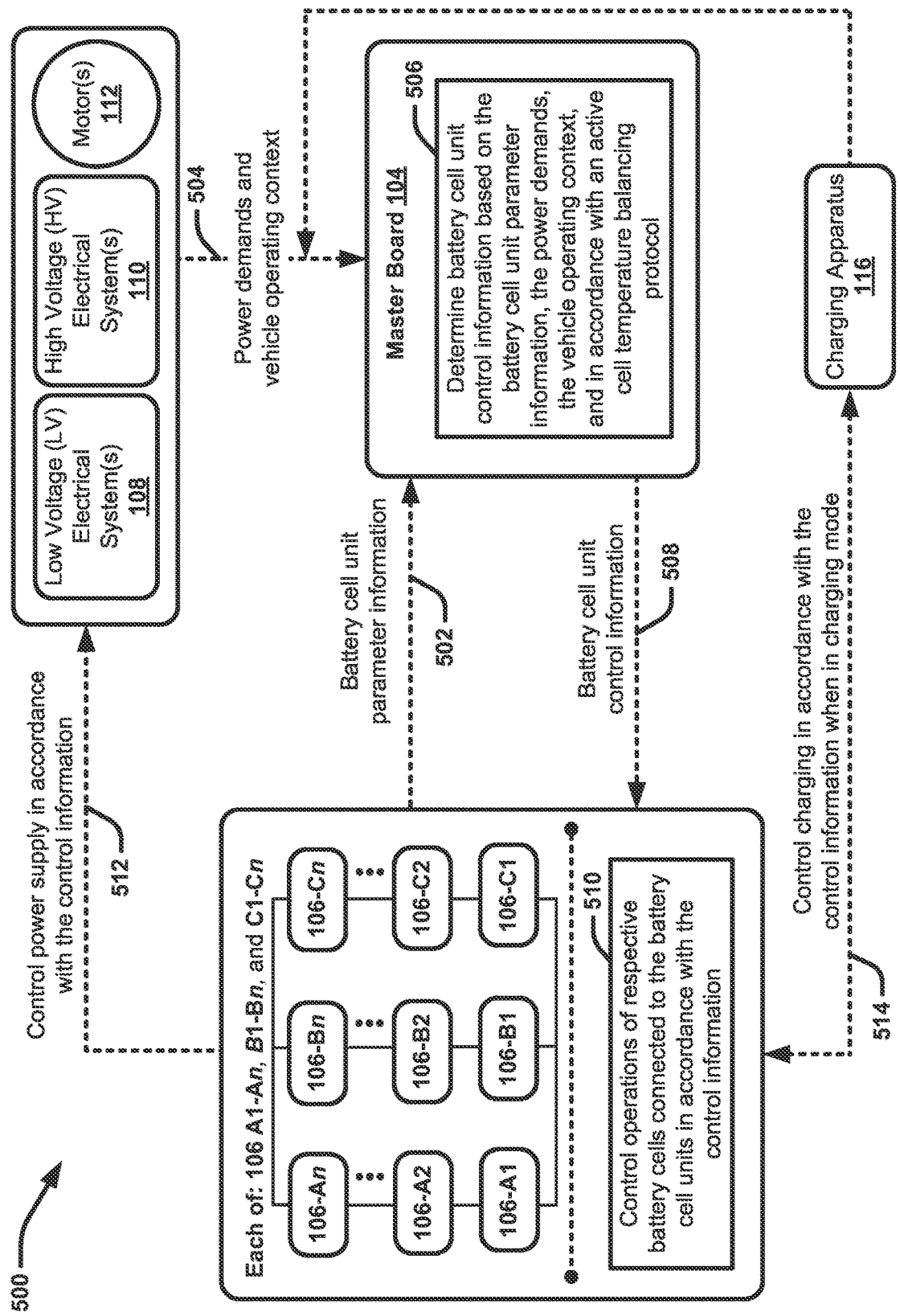
FIG. 5 illustrates a high-level flow diagram of an example control process for a smartcell battery system that incorporates active cell temperature balancing, in accordance with one or more embodiments described herein.

In this regard, FIG. 5 illustrates a high-level flow diagram of an example control process 500 for the smartcell battery system 102, in accordance with one or more embodiments described herein. With reference to FIGS. 1-5, in accordance with process 500, each of the battery cell units 106 A1-n, B1-n, and C1-n can communicate battery cell unit parameter information 502 to the master board 104. For example, over the course of operation of the vehicle 100 (e.g., including driving and charging operations, and in some implementations when the vehicle is not in an active operating mode), each of the battery cell units 106 A1-n, B1-n, and C1-n can be configured to provide the master board 104 with battery cell unit parameter information 502 comprising information identifying or indicating one or more parameters of the battery cell units. As described above with reference to FIG. 3, the battery cell unit parameter information 502 can include information regarding current conditions of the battery cell units 106 and/or respective battery cells 202 of the battery cell units, such as but not limited to: temperature, cell pressure, cell chemistry, cell resistance level, cell voltage level, current/voltage input/output magnitude, current flow utilization, SOC, SOH, impedance, and various other parameters as described herein. The battery cell units 106 A1-n, B1-n, and C1-n can be configured to provide the battery cell unit parameter information 502 to the master board 104 in accordance with a defined frequency (e.g., every 1.0 millisecond, every 1.0 second, every 1.0 minute, every 5.0 minutes, etc.), in response to a trigger event (e.g., charge level dropping below a threshold or the like), and/or in response to a request received from the master board 104.

The master board 104 can further monitor (e.g., via the monitoring component 406) the battery cell unit parameter information 502 over time in association with detecting changes to states and conditions of the respective battery cell units 106 and/or their respective battery cells 202. In addition, at 504 the master board 104 can monitor the current power demands of the respective electrical systems of the vehicle 100, including the one or more LV electrical systems 108, the one or more HV electrical systems 110 and the one or more motors 112. In association with monitoring the current power demands at 504, the master board 104 can also monitor the vehicle operating context. For example, the vehicle operating context can reflect the operating mode of the vehicle 100, such as but not limited to: on/off, stationary/idle, driving, city driving, highway driving, fast driving, slow driving, autonomous driving, charging (e.g., AC and/or DC), fast charging (AC and/or DC) and so on. In this regard, as illustrated in FIG. 5, the master board 104 can detect and/or determine when the vehicle 100 is connected to an external charging apparatus 116. The master board 104 can also detect and determine the type of the charging apparatus 116 and the charging capabilities (e.g., capacity/magnitude) of the charging apparatus. As described in greater detail below, the master board 104 can further selectively control charging of the battery cells 202 of the smartcell battery system 102 in association with connection to the external charging apparatus 116. The vehicle operating context can also reflect external climate conditions (e.g., weather, temperature, etc.), location, route, terrain, driving patterns and the like.

Based on the monitored battery cell unit parameter information 502, the power demands and the vehicle operating context, at 506 the master board 104 can determine (e.g., using scheduling component 408) and communicate (e.g., transmit, broadcast, send, etc.) battery cell unit control information 508 to the respective battery cell units 106 A1-n, B1-n, and C1-n that directs the respective battery cell units how to operate their respective battery cells 202. As described in greater detail infra, in accordance with the disclosed techniques, at 506, the scheduling component 408 can particularly be configured to determine the battery cell unit control information 508 based on the battery cell unit parameter information 502, the power demands and the vehicle operating context in accordance with an active cell temperature balancing protocol. The master board 104 can further communicate the battery cell unit control information 508 to respective battery cell units 106 A1-n, B1-n, and C1-n, and at 510, the battery cell units 106 A1-n, B1-n, and C1-n can in turn control operations of their respective battery cells in accordance with the control information 508 (e.g., via their local control component 304). For example, depending on the contents of the battery cell control information and the operating context of the vehicle 100, this can include, at 512 controlling power supply to the one or more electrical systems of the vehicle in accordance with the battery cell unit control information 508, controlling charging of the battery cells when in charging mode at 514, as well as additional operations specifically tailored to increase temperatures of one or more battery cells having a low current temperature (e.g., relative to one or more thresholds, such less than 25° C. less than 15° C., less than 10° C., less than 0° C. and so on).

In this regard, each of the battery cell units 106 A1-$n$, B1-$n$, and C1-$n$ can be configured to independently control (e.g., via their local control components 304) operations of respective battery cells 202 connected to the cluster boards 204 of the respective battery cell units in accordance with the battery cell unit control information 508. To this end, the battery cell unit control information 508 can include or correspond to scheduling information that directs the respective battery cell units 106 A1-$n$, B1-$n$, and C1-$n$ when and how to operate, including when to activate and deactivate supplying AC and/or DC power to the respective electrical systems of the vehicle 100, how much power (e.g., voltage level and/or Ampere level) to provide, and when to activate reverse current flows in association with charging operations. Because each of the battery cell units 106 A1-$n$. B1-$n$, and C1-$n$ can be independently controlled, the number of battery cell units 106 and/or the number of battery cells 202 being utilized to supply electrical current to the one electrical systems of the vehicle 100 can be tailored based on the power demands. In this regard, the master board 104 can selectively control utilization of the battery cell units 106 and/or their respective battery cells as needed to meet the power demands, including utilizing only a portion of the battery cell units 106 at any given time. In other words, the master board 104 can selectively control activating some of the battery cell units 106 and deactivating other ones of the battery cell units 106 over the course of operation of the vehicle as needed to meet the power demands.

In various embodiments, the control logic followed by the scheduling component 408 to determine which battery cell units to activate and when can be based on balancing utilization of the respective battery cell units 106 in accordance with their respective states of charge (SOC). In this regard, the SOC of a battery cell 202 decreases the longer a battery cell unit is utilized and the greater the amount of output current supplied. Accordingly, the scheduling component 408 can schedule utilization of the respective battery cell units 106 to supply DC and/or AC power to the one or more electrical systems based on their reported SOCs (e.g., included in the battery cell unit parameter information 302) in a manner that prioritizes utilization of those battery cell units 106 with higher SOCs.

In accordance with the disclosed techniques, in addition and/or alternative to the SOCs of the respective battery cell units 106 A1-$n$. B1-$n$, and C1-$n$ (or more particularly their respective battery cells 202), the master board 104 can further schedule (e.g., via the scheduling component 408) utilization of the respective battery cell units 106 A1-$n$, B1-$n$, and C1-$n$ in a manner that regulates the temperatures of the respective battery cell units. More particularly, the scheduling component 408 can determine and schedule operations of the respective battery cells 202 using an active cell temperature balancing protocol tailored to selectively increase temperatures of select battery cells having a current temperature (e.g., reported in the battery cell unit parameter information 502) below a threshold temperature (e.g., 25° C.). The active cell temperature balancing protocol can define one or more operating processes applicable to the battery cells 202 under varying conditions/contexts of the battery cells 202 of the smartcell battery system 102 (e.g., individually and/or collectively), power demands and operating contexts of the vehicle 100 that can result in selectively increasing the temperature of one or more of the battery cells having a low temperature (e.g., relative to one or more thresholds).

To this end, the one or more control processes applicable to increase the temperature of colder battery cells than others do not involve utilizing any external heating apparatus. On the contrary, the one or more processes applicable to increase the temperature of colder battery cells involve internally heating by charging and/or discharging the cells through high magnitude (e.g., between about 200 Amperes (Amps) and about 400 Amps) pulse currents respectively generated over very short durations of time (e.g., about 1.0 us to about 1.0 second) over a period of time (e.g., about 1.0 us to about 10.0 seconds) until the cut-off voltage of the cell is reached. By providing short bursts of high magnitude charge and/or discharge currents less than 1.0 second and more preferably on the order of microseconds, the temperature of the cells can be increased and the internal resistance of the cells can be decreased without negatively affecting the battery life of the cells.

In some implementations, the charge and discharge current can respectively be circulated between a subset (e.g., including two or more) of low temperature battery cells to internally heat up the respective cells, wherein the subset can include battery cells associated with different clusters 206 (and controlled by different cluster boards 204 and local control components 304). In other implementations, the discharge current removed from one or more low temperature battery cells can be redistributed to one or more other cells of the smartcell battery system 102. For example, the one or more other cells can include cells having low temperatures and/or low SOCs.

In various embodiments, the active cell temperature balancing protocol can include constraints based on temperatures, SOC and/or SOH of the respective battery cells. For example, in some embodiments, the active cell temperature balancing protocol can restrict withdrawing current from battery cells having a SOC and/or SOH below a threshold level (e.g., 20% with respect to SOC and 80% with respect to SOH). Similarly, the active cell temperature balancing protocol can restrict supplying current to battery cells having a temperature exceeding a maximum threshold temperature (e.g., 40° C.), and/or restrict supplying current to battery cells having a high SOC relative to a threshold SOC (e.g., 80%, 90%, etc.) despite having a low temperature. Ideally, the active cell temperature balancing protocol can favor supplying current withdrawn from colder battery cells to other colder battery cells having lower states of charge relative to colder battery cells having higher states of charge. The active cell temperature balancing protocol can also favor supplying current withdrawn from colder battery cells to other warmer battery cells having lower states of charge relative to warmer battery cells having higher states of charge.

Figure 6:
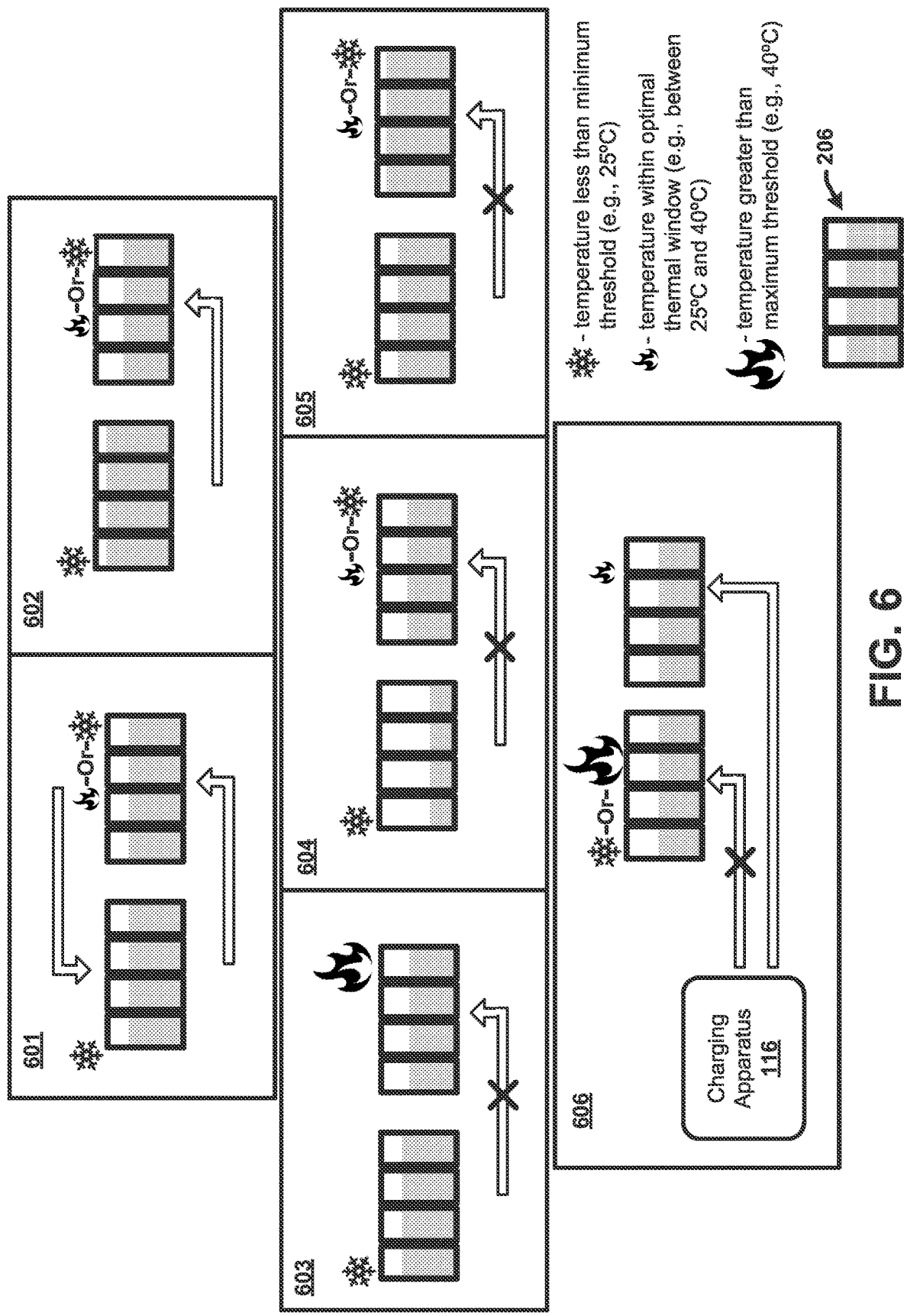
FIG. 6 illustrates example control protocols that facilitate active cell temperature balancing, in accordance with one or more embodiments described herein.

FIG. 6 illustrates example control protocols that facilitate active cell temperature balancing, in accordance with one or more embodiments described herein. As illustrated in FIG. 6, the respective control protocols 601-606 are demonstrated with respect to clusters of battery cells respectively comprising four battery cells. With reference to FIGS. 1-6, in various embodiments, each of the clusters of battery cells illustrated in FIG. 6 respectively correspond to a cluster 206 that is controlled by a separate cluster board 204. Although processes 601-606 are illustrated using two clusters. In this regard, it should be appreciated that although only two clusters are illustrated in processes 601-606 for sake of simplicity. In addition, it should be appreciated that the number of battery cells included in each cluster can vary. Further, the example processes 601-606 can involve individual battery cells 202 as opposed to clusters of battery cells. The relative SOC (or percentage of charge) of the battery cells as illustrated in FIG. 6 is indicated with grey fill. The "snowflake" symbol is used to indicate the temperature of a particular cluster is less than a minimum low temperature threshold (e.g., 25° C.). The small fire symbol is used to indicate the temperature of a particular cluster is within the optimal thermal operating window (e.g., between 25° C. and 40° C.). The large fire symbol is used to indicate the temperature of a particular cluster is greater than a maximum high temperature threshold (e.g., 40° C.).

Process 601 illustrates a first example control protocol or process that can be used to internally heat respective battery cells of a low temperature cluster. Process 601 involves circulating electrical current between two (or more) different clusters of battery cells. As indicated in process 602, the two (or more) battery cell clusters can include at least one first cluster having a low temperature (e.g., below the threshold). The second cluster or clusters can include clusters having a low temperature or an optimal temperature (e.g., within the optimal thermal window). In particular, the circulating of the electrical current can comprise circulating pulsed amounts of the electrical current between the respective battery cells included in the first cluster and the one or more second clusters, the pulsed amounts corresponding to respective amounts of the electrical current extracted from or supplied to the respective battery cells included within the first cluster and/or the one or more second clusters over respective pulse durations of less than 1.0 second, and more preferably over respective pulse duration of about 1.0 μs. In various embodiments, the magnitude of the pulsed amounts of the electrical current is between about 200 and about 500 Amps, more preferably between about 300 and 500 Amps, and even more preferably about 400 Amps. The periodicity or duty cycle between pulsed amounts can be less than 1.0 second and more preferably about 1.0 us or less. The total duration for performance of process 601 can be based on the monitored temperature, SOC, SOH, and other parameters of the respective cells. For example, the total duration for performance of process 601 can be based on the low temperature cluster or clusters reaching a desired temperature target (e.g., a target value between 25° C. and 40° C.), which can vary depending on the external climate temperature. In another example, the active cell temperature balancing duration can be proportional to cell's SOC, temperature, SOH and 1/(Cell Operation Time). Additionally, or alternatively, the total duration for performance of process 601 can be based on the monitored voltage level of the cluster reaching a target voltage level.

In various embodiments, in accordance with the active cell temperature balancing protocol, the scheduling component 408 can schedule two or more of the battery cell units 106 A1-$n$. B1-$n$, and C1-$n$ to perform process 601 to internally heat up the respective battery cells, the two or more battery cell units including at least one low temperature cluster 206 (e.g., relative to the minimum threshold). For example, the battery cell control information 508 provided to the two or more battery cell units can direct the local control components 304 thereof to control electric current flow between respective cells of the two or more clusters in accordance with process 601. The control information can include control parameters that define the magnitude of the pulsed currents, the periodicity and the total duration for performance of process 601. In some embodiments, the active cell temperature balancing protocol can restrict usage of process 601 to battery cells having a minimum SOC and/or SOH. For example, if the SOC and/or SOH of one battery cell is below a threshold (e.g., 20% with respect to SOC and 80% with respect to SOH), the active cell temperature balancing protocol can restrict withdrawing current from the battery cell despite having a low temperature.

Process 602 illustrates a second example control protocol or process that can be used to internally heat respective battery cells of a low temperature cluster. Process 602 involves discharging or removing high magnitude pulsed current from a low temperature cluster and providing the extracted current to one or more second battery cell clusters having a low temperature and/or SOC (e.g., relative to respective thresholds). In this regard, process 602 is referred to herein as selective discharging of battery cells. Battery cells can be selectively discharged in accordance with process 602 to increase the internal resistance thereof which results in internally heating the battery cells. Similar to process 601, respective battery cells of a colder cluster can be selectively discharged by extracting pulsed amounts of the electrical current from the colder cluster, the pulsed amounts corresponding to respective amounts of the electrical current extracted from the respective battery cells over respective pulse durations of less than 1.0 second, and more preferably over respective pulse duration of about 1.0 μs. In various embodiments, the magnitude of the pulsed amounts of the electrical current is between about 200 and about 500 Amps, more preferably between about 300 and 500 Amps, and even more preferably about 400 Amps. The periodicity or duty cycle between pulsed amounts can be less than 1.0 second and more preferably about 1.0 μs or less. The total duration for performance of process 602 can be based on the monitored temperature, SOC, SOH, and other parameters of the respective cells. For example, the total duration for performance of process 602 can be based on the low temperature cluster or clusters reaching a desired temperature target (e.g., a target value between 25° C. and 40° C.), which can vary depending on the external climate temperature. In another example, the active cell temperature balancing duration can be proportional to cell's SOC, temperature, SOH and 1/(Cell Operation Time). Additionally, or alternatively, the total duration for performance of process 602 can be based on the monitored voltage level of the cluster reaching a target voltage level. The extracted discharge currents can be supplied to one or more second clusters having a low temperature and/or a low SOC.

Figure 7:
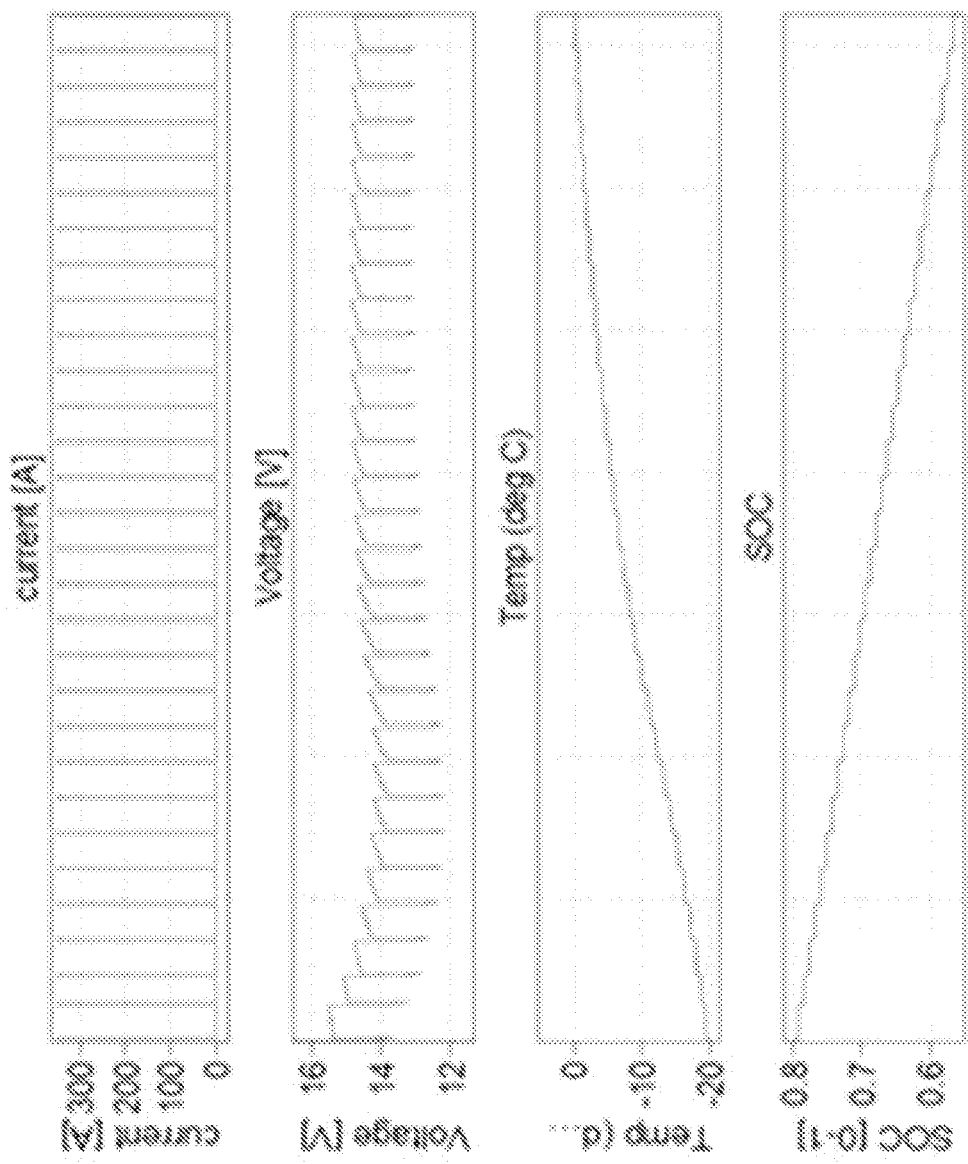
FIG. 7 presents graphs illustrating the impact of an active cell discharging process on, voltage, temperature and state of charge, in accordance with one or more embodiments described herein.

FIG. 7 presents graphs illustrating the impact of an active cell discharging process (e.g., process 602) on voltage, temperature and SOC, in accordance with one or more embodiments described herein. The respective graphs shown in FIG. 7 demonstrate the active discharge process (e.g., process 602) as applied to a cluster of battery cells to bring the respective cells from an extreme low temperature of −20° C. to 0° C. As illustrated in FIG. 7, individual battery cells can be discharged via removing high amplitude (e.g., 300 Amps) pulsed currents from the respective cells. This results in internally increasing the temperature of the respective cells. The drop in voltage and SOC can be noticed while extracting high discharge current.

With reference again to FIGS. 1-6, in various embodiments, in accordance with the active cell temperature balancing protocol, the scheduling component 408 can schedule two of the battery cell units 106 A1-$n$, B1-$n$, and C1-$n$ to perform process 602, the two or more battery cell units comprising at least one first low temperature cluster from which the electrical discharge current is to be withdrawn and one or more second clusters to which the discharge current is to be supplied, preferably one or more second clusters having a low temperature and/or a low SOC. For example, the battery cell control information 508 provided to the respective battery cell units can direct the respective units to perform process 602 and identifying which cluster from which the discharge current is to be extracted and which clusters to which the electrical current is to be supplied. The control information can include control parameters that define the magnitude of the pulsed currents, the periodicity and the total duration for performance of process 602.

In some embodiments, the active cell temperature balancing protocol can restrict usage of process 602 to battery cells having a minimum SOC and/or SOH. For example, if the SOC and/or SOH of one or more battery cells is below a threshold (e.g., 20% with respect to SOC and 80% with respect to SOH), the active cell temperature balancing protocol can restrict withdrawing discharge current from the battery cell despite having a low temperature, as indicated via example process 603 (e.g., noting process 603 illustrates a control process that is not to be performed). Similarly, the active cell temperature balancing protocol can restrict usage of process 602 to provide the extracted discharge current to battery cells having temperatures greater than the maximum threshold temperate to prevent thermal runaway, as indicated via example process 604 (e.g., noting process 604 illustrates another control process that is not to be performed). In addition, the active cell temperature balancing protocol can restrict usage of process 602 to provide the extracted discharge current to battery cells having a low or normal temperature yet having an SOC greater than a threshold SOC (e.g., 80%, 90%, etc.), as indicated via example process 605 (e.g., noting process 605 illustrates another control process that is not to be performed).

The active cell temperature balancing processes 601 and 602 respectively enable the smartcell battery system 102 to selectively increases the temperatures of battery cells having lower temperatures than others, which facilitates maintaining a uniform temperature of the battery cells inside the battery pack, thereby optimizing battery safety, performance and lifespan. In various embodiments, the internal heating of the cells using processes 601 and/or 602 can be performed during any operating context of the vehicle (e.g., during standstill of the vehicle, driving of the vehicle and during both AC charging and DC charging).

In this regard, the active cell temperature balancing protocol used by the smartcell battery system 102, and more particularly the scheduling component 408 of the master board 104, which selectively determines which battery cell clusters to direct to apply processes 601 and/or 602, under the conditions and constraints described above, can account for a plurality of many interrelated variables (e.g., respective cell temperatures, SOC, SOH, power demands, operating context of the vehicle, external climate, and various others). For example, the active cell temperature balancing protocol can define one or more operating processes (e.g., 601 and/or 602) applicable to the battery cells 202 under varying conditions/contexts of the battery cells 202 of the smartcell battery system 102 (e.g., individually and/or collectively), power demands and operating contexts of the vehicle 100, that "best" result in selectively increasing the temperature of one or more of the battery cells having a low temperature (e.g., relative to one or more thresholds). In some embodiments, the active cell temperature balancing protocol can employ one or more predefined optimization functions that account for these dynamic variables.

In this regard, the particular control protocol used for balancing the cell temperatures can be tailored based on the operating context of the vehicle (e.g., standstill, city-driving, high-speed driving, AC fast charging, DC fast charging, et.). For example, in some embodiments, during city driving where the full voltage of the battery pack is often not required, the control protocol can selectively ignore using power from those cells having lower temperatures than other cells, leading to better driving efficiency. The active cell temperature balancing protocol can generally prioritize usage of processes 601 and/or 602 for battery cells that are colder than other ones (e.g., the colder the cell the higher priority for application of processes 601 and 602) and prioritize provision of extracted discharge currents to those cells having lower temperatures than other ones and/or lower SOCs.

In addition, the active cell temperature balancing protocol can also control the usage priority of the respective battery cells 202 of the smartcell battery system 102 for supplying power to the respective electrical systems of the vehicle based on temperature, SOC, SOH, power demands, operating context and so on. To this end, the active cell temperature balancing protocol can control the priority order for scheduling usage of the battery cells to supply power to the electrical systems of the vehicle based on the power demands and using a specific formula/strategy to maintain uniform temperature of the cells. For example, in various embodiments, the priority order can be determined/controled in accordance with the following example usage priority Equation:

$$\propto SOC, 1.5*\text{Temperature}, 1/(\text{Cell Operational Usage}) \quad \text{Priority Equation}$$

In accordance with the example usage priority equation, the usage priority order of the respective battery cells of the smartcell battery system 102 will help to maintain battery safety, high charging efficiency, high driving efficiency, performance, durability minimize thermal runaway of the cells.

In another example, in some embodiments, during operation of battery cells in accordance with processes 601 and 602, the respective battery cells may be operatively and/or logically not available for usage to supplying power to the one or more electrical systems. Accordingly, the active cell temperature balancing protocol can control timing of performance of processes 601 and 602 and scale the number of battery cell units involved based on the power demand (e.g., generally instructing more battery cell units to employ processes 601 and 602 when as power demands decrease). In this regard, the active cell temperature balancing protocol used by the scheduling component 408 can be configured to selectively engage battery cells according to the their temperature, SOC, SOH and many other factors, wherein the cells having lower health and/or SOH are lower in priority for usage for supplying power to the electrical systems of the vehicle and lower in priority for applying one or more of the internal heating processes 601 and 602.

In addition, the active cell temperature balancing protocol can facilitate increasing the temperatures of respective battery cell prior to performing charging thereof via an external charging apparatus 116 so that the charging apparatus can be operated at its highest efficiency. In this regard, as noted above, the process of performing fast charging on battery cells having low temperatures can result in degradation of lithium plating and thus negatively affecting battery performance and lifespan over time. In some embodiments, the master board 104 can include charge regulation component 414 to control and/or regulate charging of the battery pack via an external charging apparatus 116 as a function of the temperatures of the respective battery cells.

In some embodiments, the charge regulation component 414 can control the charging rate of the external charging apparatus 116 as used to charge the entire battery back as a function of the temperatures of the battery cells. For example, in some implementations, the charge regulation component 414 can determine the appropriate charging rate for charging the battery pack via the external charging apparatus 116 in proportion to the lowest temperature battery cell such that as the lower the temperature, the lower the charging rate. In this regard, the charge regulation component 414 can reduce or limit the charging rate of one or more battery cells based on the respective temperatures of the one or more battery cells being below the threshold temperature. To facilitate this end, in some embodiments, the charge regulation component 414 can determine the appropriate charging rate as function of the lowest temperature battery cell of the pack and the master control component 404 can instruct the respective cluster boards 204 to limit the charging current received and transferred to the battery cells from the external charging apparatus 116. In some implementations of these embodiments, as the temperature of the battery cells increases over the duration of changing, the charge regulation component 414 can dynamically increase the charging rate. In other embodiments, the charge regulation component 414 can be configured to inform an operator of the vehicle regarding when to charge and not charge the battery pack and/or what charging rate to apply when using an external charging apparatus 116 based on the temperature, SOC of the respective battery cells the vehicle. For example, the charge regulation component 414 can generate and provide the vehicle operator (e.g., via communication component 420 and any suitable output device associated with the vehicle 100 and/or the operator and communicatively coupled to the master board 104) with a notification message or the like informing the operator when to charge and not charge the battery pack and/or what charging rate to apply as determined based on the temperature, SOC of the respective battery cells. For instance, the charge regulation component 414 can instruct the operator to avoid charging the battery pack based on the temperature of one or more of the battery cells being below a threshold and/or the SOC of the battery pack being above an acceptable threshold for usage of the vehicle under a current operating context (e.g., based on route, speed and associated power demands). The charge regulation component 414 can further instruct the operator when to perform fast charging based on the temperatures of the battery pack becoming within the thermal operating window as a result of application of the disclosed active temperature balancing protocols.

Still in other embodiments, the fast-charging equipment can be operated at its highest efficiency (e.g., at its highest current magnitude) even at low temperatures owing to the ability to internally increase the temperatures of the battery cells prior to performing fast-charging and the ability to selectively control the charging rate applied to individual battery cells 202 and/or clusters based on their respective temperatures. For example, in some embodiments, the charge regulation component 414 can selectively limit fast charging to only those cells having temperatures within a defined thermal window (e.g., ideally 25-40° C.), thus performing selective fast charging, as illustrated in accordance with process 606. In this regard, as illustrated in process 606, the charge regulation component 414 can determine control information (e.g., battery cell unit control information 508) that directs one or more of the battery cells units 106 having battery cells with temperatures outside the optimal thermal operating window to prevent (e.g., close off the corresponding input current channels) charging of the respective battery cells when the vehicle 100 is being charged using an external charge apparatus 116. In other embodiments, the charge regulation component 414 can determine control information (e.g., battery cell unit control information 508) that directs one or more of the battery cells units 106 having battery cells with temperatures below the minimum threshold temperature to limit the charging rate of charge current supplied to those battery cells via the external charging apparatus (e.g., using 100 A as opposed to 300 A for example).

In various embodiments, the scheduling component 408 and the charge regulation component 414 can employ machine learning component 412 to facilitate determining the battery cell unit control information 508 in according with the active cell temperature balancing protocol. To this end, machine learning component 412 can employ one or more machine learning (ML) and/or artificial intelligence (AI) models to learn, for instance, relationships (e.g., cause and/or effect) between operating modes/conditions of the respective battery cell units 106, temperatures of the battery cells 202 and/or clusters 206, the power demands and various other parameters (e.g., any of the parameters included in the battery cell unit parameter information 502, external climate parameters, forecasted parameters, and constraints on the active cell balancing protocol discussed herein). Also, the monitoring component 406 on master board 104 can monitor impedance of the cells through EIS measurements and the machine learning component 408 can be used to infer and trigger any anomalies. In these embodiments, based on learning such relationships, the scheduling component 408 can employ the one or more ML and/or AI models to perform one or more tasks including, but not limited to, determining or inferring the battery cell unit control information 508, making a prediction, making an estimation (e.g., cell capacity (e.g., electric energy) of active cell material), classifying data, implementing one or more monitoring and/or control operations, and/or another task. In some embodiments, such a machine learning model can comprise a machine learning model based on artificial intelligence (AI) including, but not limited to, a shallow or deep neural network model, a support vector machine (SVM) model, a classifier, a decision tree classifier, a regression model, and/or any supervised or unsupervised machine learning model that can perform the operations of the machine learning component described above.

Figure 8:
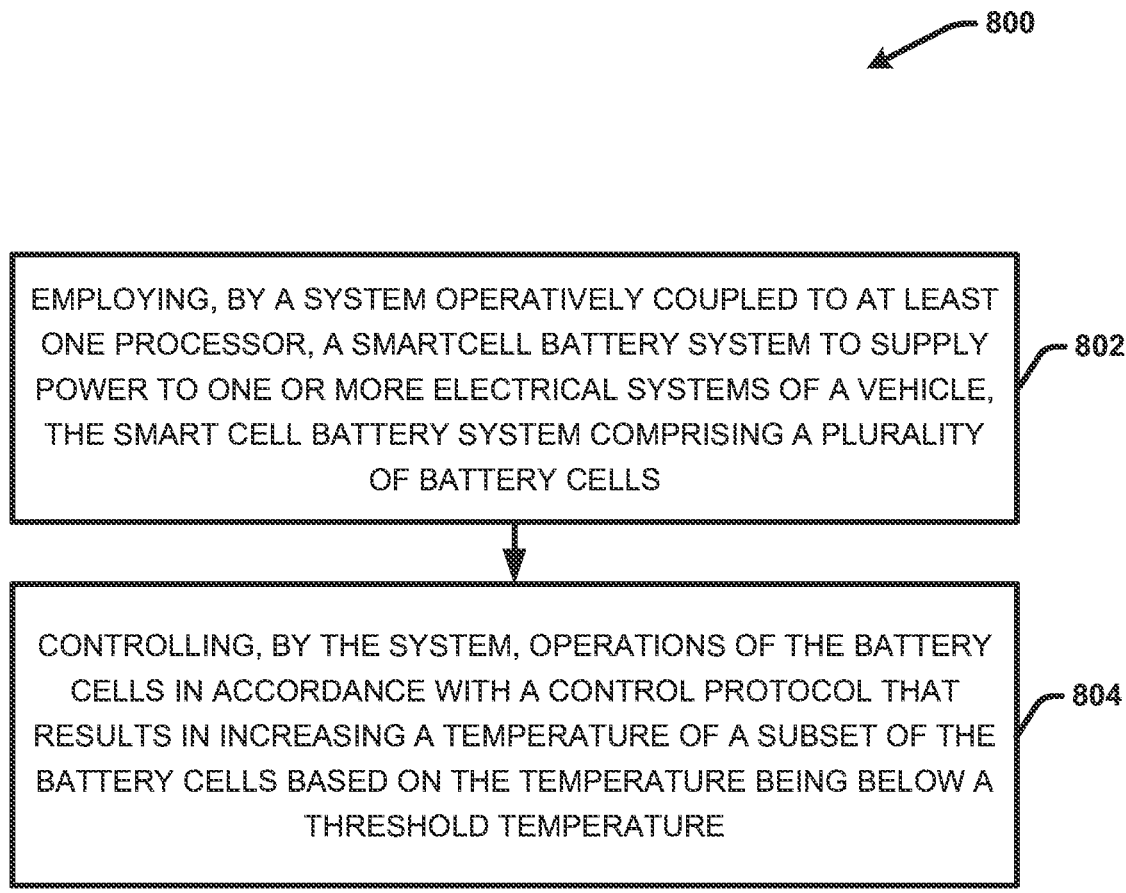
FIG. 8 illustrates an example, computer-implemented method for performing active cell temperature balancing, in accordance with one or more embodiments described herein.

FIG. 8 illustrates an example, computer-implemented method 800 for performing active cell temperature balancing, in accordance with one or more embodiments described herein. Method 800 comprises, at 802, employing, by a system operatively coupled to at least one processor (e.g., vehicle 100 and/or master board 104), a smartcell battery system (e.g., smartcell battery system 102) to supply power to one or more electrical systems of a vehicle, the smart cell battery system comprising a plurality of battery cells (e.g., respective battery cells 202 controlled by the respective cluster boards 204). At 804, method 800 comprises controlling, by the system (e.g., via the master board 104 and the respective cluster boards 204), operations of the battery cells in accordance with a control protocol that results in increasing a temperature of a subset of the battery cells based on the temperature being below a threshold temperature. For example, the subset can include a single battery cell 202, a cluster 206, and/or two or more battery cells 202 respectively associated with different battery cell units of the respective battery cell units 106 A1-*n*, B1-*n*, and C1-*n*. In this regard, the controlling can comprise determining battery cell unit control information 508 (e.g., by the scheduling component 408) in accordance with the active cell temperature balancing protocol and directing the respective battery cell units to control operations of the battery cells accordingly. This can include for example, directing one or more of the battery cell units to control electrical current flow associated with the battery cells controlled thereby in accordance with process 601, process 602, process 603, process 606 and various others.

Figure 9:
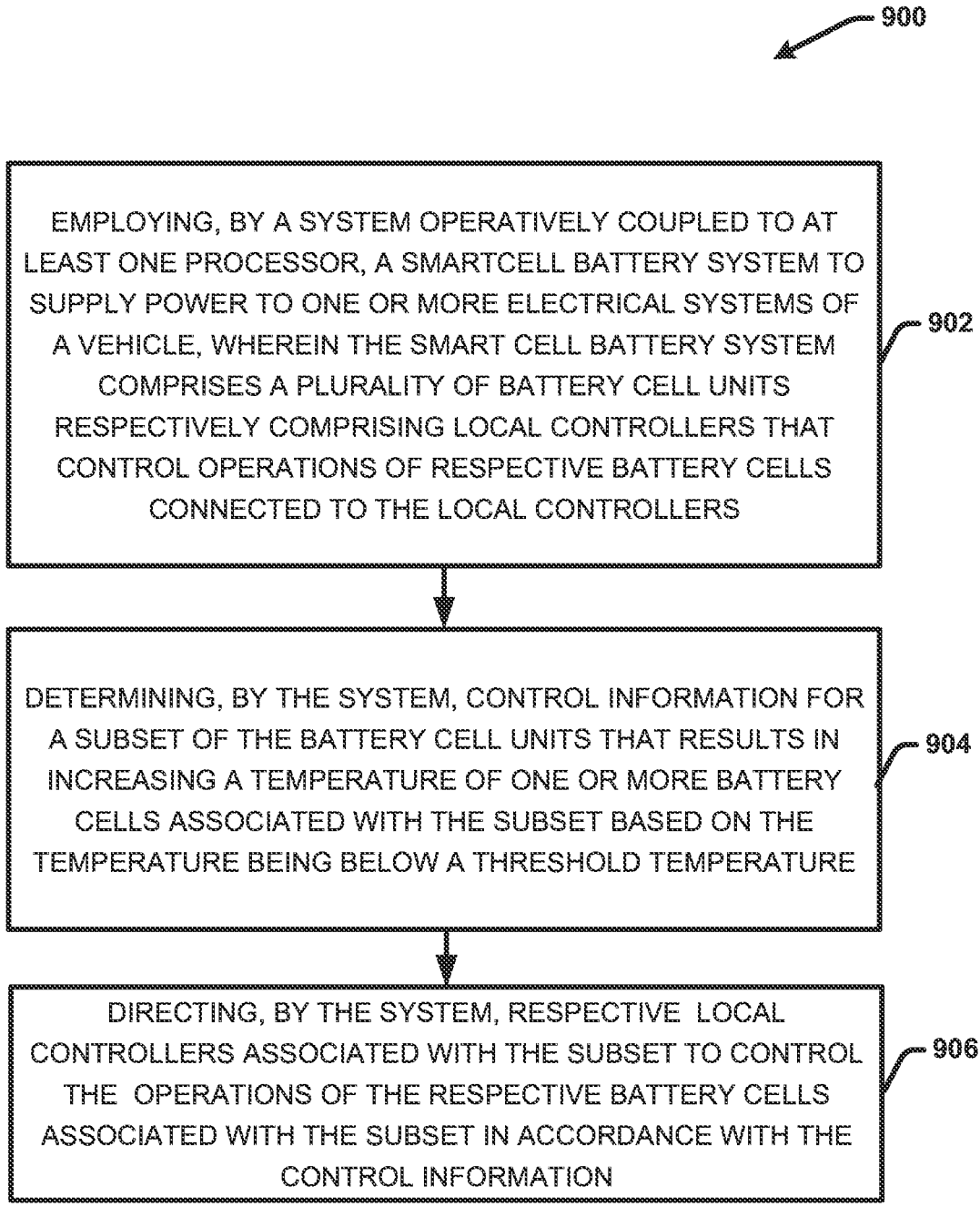
FIG. 9 illustrates another example, computer-implemented method for performing active cell temperature balancing, in accordance with one or more embodiments described herein.

FIG. 9 illustrates another example, computer-implemented method 900 for performing active cell temperature balancing, in accordance with one or more embodiments described herein. Method 900 comprises, at 902, employing, by a system operatively coupled to at least one processor (e.g., vehicle 100 and/or master board 104), a smartcell battery system (e.g., smartcell battery system 102) to supply power to one or more electrical systems of a vehicle, wherein the smart cell battery system comprises a plurality of battery cell units (e.g., battery cell units 106 A1-*n*, B1-*n*, and C1-*n*) comprising local controllers (e.g., cluster board 204 and/or local control component 304) that control operations of respective battery cells connected to the local controllers. At 904, method 900 comprises determining, by the system (e.g., via scheduling component 408), control information for a subset of the battery cell units that results in increasing a temperature of a subset of the battery cells based on the temperature being below a threshold temperature. For example, the subset can include a single battery cell 202, a cluster 206, and/or two or more battery cells 202 respectively associated with different battery cell units of the respective battery cell units 106 A1-*n*, B1-*n*, and C1-*n*. At 906, method 900 comprises directing, by the system (e.g., via master control component 404), respective local controllers associated with the subset to control the operations of the respective battery cells in accordance with the control information. In this regard, it should be appreciated that the scheduling component 408 can selectively determine control information for a subset of the battery cell units (e.g., the subset including one or more units) and the master control component 404 can selectively direct only the subset to perform operations in accordance with the corresponding control information.

Figure 10:
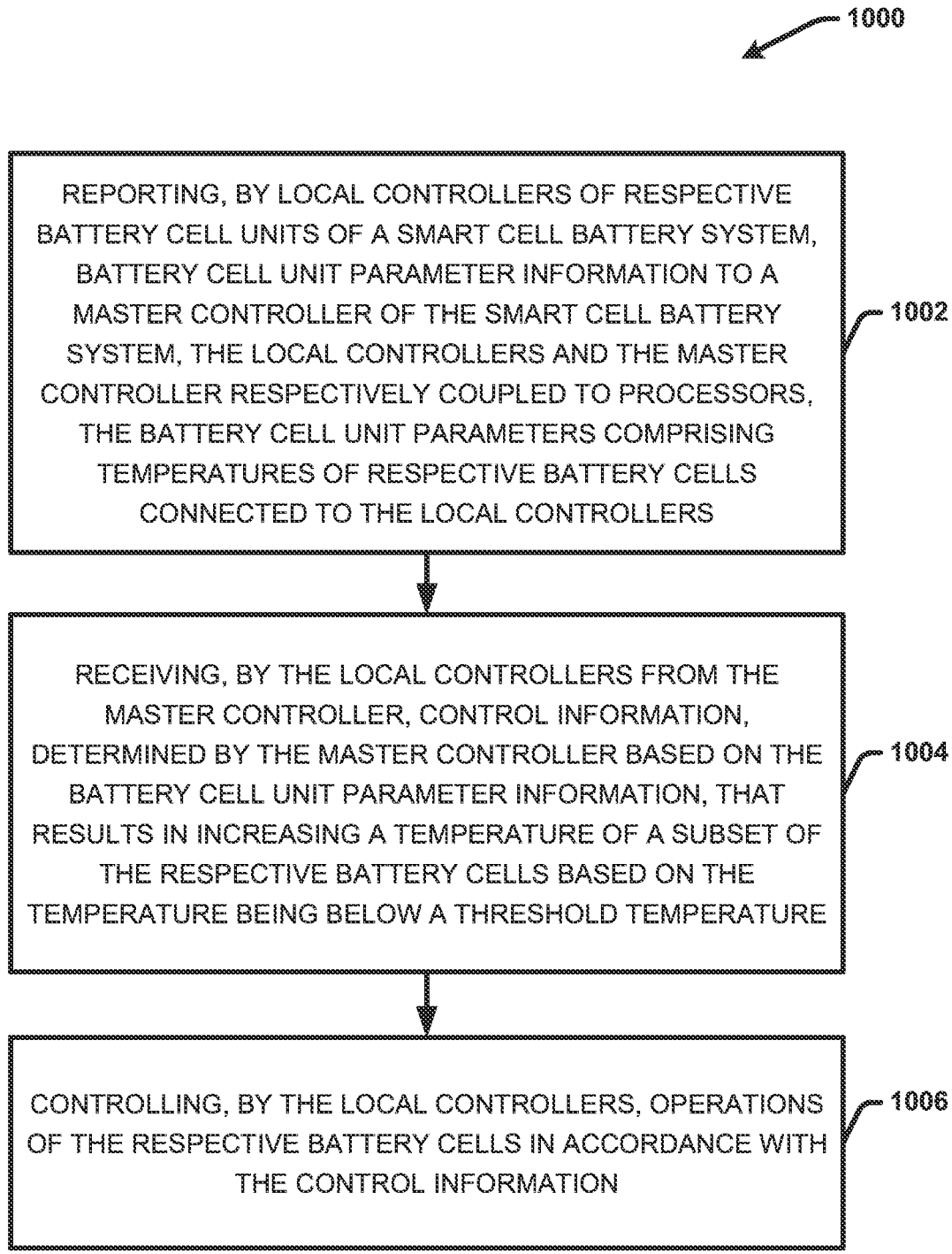
FIG. 10 illustrates another example, computer-implemented method for performing active cell temperature balancing, in accordance with one or more embodiments described herein.

FIG. 10 illustrates another example, computer-implemented method 1000 for performing active cell temperature balancing, in accordance with one or more embodiments described herein. Method 1000 comprises, at 1002, reporting, by local controllers of respective battery cell units of a smartcell battery system, battery cell unit parameter information (e.g., battery cell unit parameter information 502) to a master controller of the smartcell battery system, the local controllers and the master controller respectively coupled to processors, the battery cell unit parameter information comprising (at least) temperatures of respective battery cells connected to the local controllers. At 1004, method 1000 comprises receiving, by the local controllers from the master controller, control information determined by the master controller (e.g., via the scheduling component 408) based on the battery cell unit parameter information, that results increasing a temperature of a subset of the battery cells based on the temperature being below a threshold temperature. For example, the subset can include a single battery cell 202, a cluster 206, and/or two or more battery cells 202 respectively associated with different battery cell units of the respective battery cell units 106 A1-*n*, B1-*n*, and C1-*n*. At 1006, method 1000 comprises controlling, by the local controllers, operations of the respective battery cells in accordance with the control information. For example, depending on the control information, the operations may include but are not limited to, one or more of the processes 601, 602, 603 and 606, and/or supplying to power to one or more electrical systems of the vehicle 100 in accordance with a usage priority order determined to balance the temperatures across the battery cells.

Figure 11:
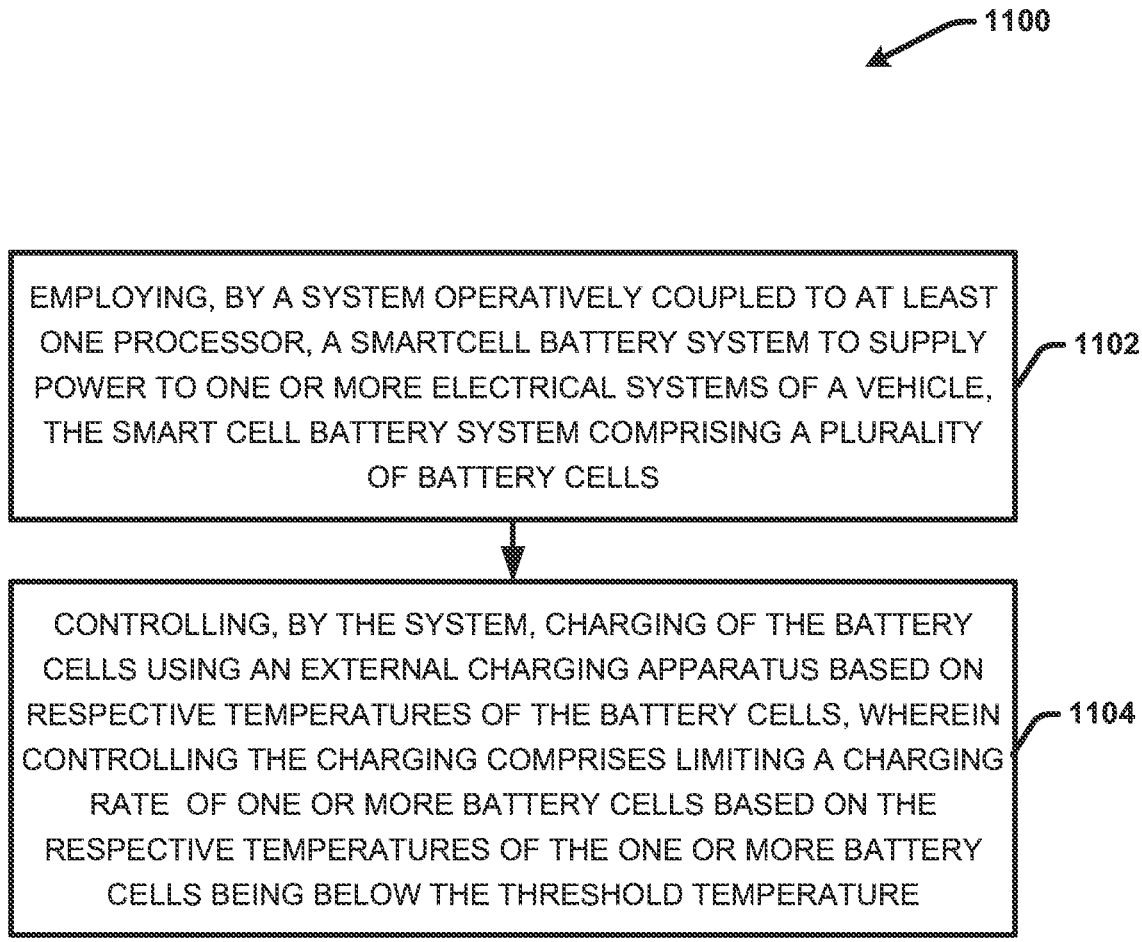
FIG. 11 illustrates another example, computer-implemented method for performing active cell temperature balancing, in accordance with one or more embodiments described herein.

FIG. 11 illustrates another example, computer-implemented method 1100 for performing active cell temperature balancing, in accordance with one or more embodiments described herein. Method 1100 comprises at 1102, employing, by a system operatively coupled to at least one processor (e.g., vehicle 100 and/or master board 104), a smartcell battery system (e.g., smartcell battery system 102) to supply power to one or more electrical systems of a vehicle, the smart cell battery system comprising a plurality of battery cells (e.g., respective battery cells 202 controlled by the respective cluster boards 204). At 1104, method 1100 comprises controlling, by the system, charging or the battery cells using an external charging apparatus (e.g., external charging apparatus 116) based on respective temperatures of the battery cells, wherein the controlling comprises limiting (or reducing) a charging rate of one or more battery cells based on the respective temperatures of the battery cells being below a threshold temperature (e.g., 25° C., 15° C., 10° C., 0° C., −5° C., or another temperature tailored to the charging capabilities/magnitude of the external charging apparatus 116).

The one or more flowcharts and/or block diagrams in the figures illustrate the architecture, functionality, and operation of one or more possible implementations of one or more systems, apparatuses and/or methods according to various embodiments described herein. In this regard, one or more blocks in the one or more flowcharts and/or block diagrams can represent a module, segment and/or portion of instructions, which can comprise one or more executable instructions for implementing the specified logical function(s). In one or more alternative implementations, one or more functions noted in one or more of the blocks can occur out of the order illustrated in the Figures. For example, one or more blocks shown in succession can be executed substantially concurrently and/or the one or more blocks can be executed in a reverse order as that illustrated, such as depending upon a functionality involved. It also will be noted that one or more blocks of the one or more flowcharts and/or block diagrams, and/or one or more combinations of one or more blocks thereof, can be implemented by a special purpose hardware-based system that can perform one or more of the specified functions and/or can carry out one or more special purpose hardware and/or computer instructions.

As indicated, one or more aspects are described herein with reference to one or more flowchart illustrations and/or block diagrams of one or more methods, apparatuses and/or systems according to one or more embodiments described herein. It will be understood that one or more blocks of the one or more flowcharts and/or block diagrams, and/or one or more combinations of blocks in the one or more flowcharts and/or block diagrams, can be implemented by one or more computer-readable program instructions.

The computer-readable program instructions can be provided to a processor of a general purpose computer, special purpose computer and/or other programmable data processing apparatus to produce a machine. For example, the instructions, which can execute via the processor of the computer and/or other programmable data-processing apparatus, can create one or more means for implementing the one or more functions and/or processes specified in the one or more flowchart and/or block diagram blocks. The computer-readable program instructions can be stored in a computer-readable storage medium that can direct a computer, programmable data processing apparatus and/or other device to function in a particular manner. For example, the computer-readable storage medium having instructions stored therein can comprise an article of manufacture including instructions that can implement one or more aspects of the one or more functions and/or processes specified in the one or more flowchart and/or block diagram blocks. The computer-readable program instructions can be loaded onto a computer, other programmable data processing apparatus and/or other device to cause one or more operational acts to be performed on the computer, other programmable apparatus and/or other device to produce a computer-implemented process. For example, the instructions that can execute on the computer, other programmable apparatus and/or other device can implement the one or more functions and/or processes specified in the one or more flowchart and/or block diagram blocks.

As it is employed in the subject specification, the term "processor" or "processing unit" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a graphics processing unit (GPU), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. As used herein, terms such as "store," "storage," "data store," data storage," "database," and substantially any other information storage component relevant to operation and functionality of a component are utilized to refer to "memory components," entities embodied in a "memory," or components comprising a memory. A processor can employ distributed and/or federated machine intelligence, which can be employed to operate and/or facilitate one or more of the aforementioned computer-readable program instructions.

Memory and/or memory components described herein can be either volatile memory or nonvolatile memory, and/or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described herein includes one or more mere examples of one or more systems and/or methods. It is, of course, not possible to describe every conceivable combination of components and/or system-implemented methods for purposes of describing the subject matter. Nonetheless, one of ordinary skill in the art can recognize that one or more further combinations and/or permutations of the disclosed subject matter are possible. Furthermore, to the extent that the terms "includes", "has", "possesses" and/or the like are used in the detailed description, claims, appendices and/or drawings, such terms are intended to be inclusive in a manner similar to the term "comprising" as "comprising" is interpreted when employed as a transitional word in a claim.

It will be understood that when an element is referred to as being "coupled" to another element, the term "coupled" can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling and/or another type of coupling. As referenced herein, an "entity" can comprise a machine, device, hardware, software, computing device and/or human. Such entity can facilitate implementation of the subject matter disclosed herein in accordance with one or more embodiments described herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance and/or illustration. For the avoidance of doubt, the subject matter disclosed herein is not limited by such examples. In addition, any aspect and/or design described herein as an "example" and/or "exemplary" is not necessarily to be construed as preferred and/or advantageous over other aspects or designs, nor is it meant to preclude equivalent exemplary structures and/or techniques known to those of ordinary skill in the art.

The description of the one or more various embodiments provided herein has been presented for purposes of illustration but is not intended to be exhaustive and/or limited to the one or more embodiments disclosed. One or more modifications and/or variations will be apparent to those of ordinary skill in the art without departing from the scope and/or spirit of the described embodiments. The terminology used herein was chosen to best explain the principles of the embodiments, practical application and/or technical improvement over technologies found in the marketplace, and/or to enable others of ordinary skill in the art to understand the embodiments disclosed herein.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    employing, by a system operatively coupled to at least one processor, a smartcell battery system to supply power to one or more electrical systems of a vehicle, the smartcell battery system comprising a plurality of battery cells; and
    controlling, by the system, operations of the battery cells in accordance with a control protocol that results in increasing a temperature of a subset of the battery cells based on the temperature being below a threshold temperature, wherein the control protocol comprises charging one or more first battery cells included in the subset, wherein the charging comprises:
        withdrawing pulsed amounts of first electrical current having between about 200 Amperes (Amps) and about 500 Amps from one or more second battery cells excluded from the subset, and supplying the pulsed amounts of first electrical current to one or more first battery cells included in the subset, the pulsed amounts of first electrical current corresponding to respective amounts of the first electrical current withdrawn from the one or more second battery cells over respective pulse durations of less than 1.0 second.

2. The method of claim 1, wherein the control protocol further comprises circulating second electrical current between respective battery cells included in the subset.

3. The method of claim 2, wherein the circulating comprises circulating pulsed amounts of the second electrical current between the respective battery cells, the pulsed amounts of the second electrical current corresponding to respective amounts of the second electrical current extracted from or supplied to the respective battery cells over respective pulse durations of less than 1.0 second.

4. The method of claim 3, wherein the second electrical current comprises a high electrical current having between about 200 Amperes (Amps) and about 500 Amps.

5. The method of claim 1, wherein the control protocol further comprises circulating second electrical current between the one or more first battery cells included in the subset and the one or more second battery cells excluded from the subset.

6. The method of claim 5, wherein the circulating comprises circulating pulsed amounts of the second electrical current between the one or more first battery cells and the one or more second battery cells, the pulsed amounts of the second electrical current corresponding to respective amounts of the second electrical current extracted from or supplied to the one or more first battery cells or the one or more second battery cells over respective pulse durations of less than 1.0 second.

7. The method of claim 6, wherein the second electrical current comprises a high electrical current having between about 200 Amperes (Amps) and about 500 (Amps).

8. The method of claim 1, wherein the control protocol further comprises discharging one or more battery cells included in the subset.

9. The method of claim 8, wherein the discharging comprises withdrawing pulsed amounts of second electrical current having between about 200 Amperes (Amps) and about 500 Amps from the one or more battery cells, the pulsed amounts of the second electrical current corresponding to respective amounts of the second electrical current withdrawn from the one or more battery cells over respective pulse durations of less than 1.0 second.

10. The method of claim 9, wherein the control protocol further comprises providing the pulsed amounts of the second electrical current to one more other battery cells excluded from the subset.

11. The method of claim 1, further comprising:
    controlling, by the system, charging of the battery cells using an external charging apparatus based on respective temperatures of the battery cells, wherein controlling the charging comprises limiting a charging rate of one or more battery cells based on the respective temperatures of the one or more battery cells being below the threshold temperature.

12. A system, comprising:
    a smartcell battery system configured to supply power to one or more electrical systems of an electric vehicle, the smartcell battery system comprising a plurality of battery cell units respectively comprising local controllers that control operations of respective battery cells connected to the local controllers;
    a memory that stores computer-executable components; and
    a processor that executes the computer-executable components stored in the memory, wherein the computer-executable components comprise:
        a master control component that directs one or more of the local controllers to control an operation of the respective battery cells connected thereto in accordance with a control protocol that results in increasing a temperature of a subset of the battery cells based on the temperature being below a threshold temperature, wherein the control protocol comprises charging one or more first battery cells included in the subset, wherein the charging comprises:
            withdrawing pulsed amounts of first electrical current having between about 200 Amperes (Amps) and about 500 Amps from one or more second battery cells excluded from the subset, and supplying the pulsed amounts of first electrical current to one or more first battery cells included in the subset, the pulsed amounts of first electrical current corresponding to respective amounts of the first electrical current withdrawn from the one or more second battery cells over respective pulse durations of less than 1.0 second.

13. The system of claim 12, wherein the control protocol further comprises circulating second electrical current between respective battery cells included in the subset.

14. The system of claim 13, wherein the circulating comprises circulating pulsed amounts of the second electrical current between the respective battery cells, the pulsed amounts of the second electrical current corresponding to respective amounts of the second electrical current extracted from or supplied to the respective battery cells over respective pulse durations of less than 1.0 second, and wherein the second electrical current comprises a high electrical current having between about 200 Amperes (Amps) and about 500 Amps.

15. The system of claim 12, wherein the control protocol further comprises circulating second electrical current between the one or more first battery cells included in the subset and the one or more second battery cells excluded from the subset.

16. The system of claim 15, wherein the circulating comprises circulating pulsed amounts of the second electrical current between the one or more first battery cells and the one or more second battery cells, the pulsed amounts of the second electrical current corresponding to respective amounts of the second electrical current extracted from or supplied to the one or more first battery cells or the one or more second battery cells over respective pulse durations of less than 1.0 second, and wherein the second electrical current comprises a high electrical current having between about 200 Amperes (Amps) and about 500 (Amps).

17. The system of claim 12, wherein the control protocol further comprises a first control protocol, and wherein the master control component directs the local controllers to control charging of the respective battery cells using an external charging circuit based on respective temperatures of the battery cells and in accordance with a second control protocol, wherein the second control protocol comprises reducing a charging rate of one or more battery cells based on the respective temperatures of the one or more battery cells being below the threshold temperature.

18. A computer program product that facilitates controlling operations of battery cells of a smartcell battery system used to supply power to one or more electrical systems of an electric vehicle, the computer program product comprising executable instructions that, when executed by a processor, facilitate performance of operations, comprising:

directing one or more local controllers to control an operation of the respective battery cells connected thereto in accordance with a control protocol that results in increasing a temperature of a subset of the battery cells based on the temperature being below a threshold temperature, wherein the control protocol comprises charging one or more first battery cells included in the subset, wherein the charging comprises:

withdrawing pulsed amounts of first electrical current having between about 200 Amperes (Amps) and about 500 Amps from one or more second battery cells excluded from the subset, and supplying the pulsed amounts of first electrical current to one or more first battery cells included in the subset, the pulsed amounts of first electrical current corresponding to respective amounts of the first electrical current withdrawn from the one or more second battery cells over respective pulse durations of less than 1.0 second.

19. The computer program product of claim 18, wherein the control protocol further comprises circulating second electrical current between respective battery cells included in the subset.

20. The computer program product of claim 18, wherein the circulating comprises circulating pulsed amounts of the second electrical current between the respective battery cells, the pulsed amounts of the second electrical current corresponding to respective amounts of the second electrical current extracted from or supplied to the respective battery cells over respective pulse durations of less than 1.0 second.

* * * * *